US008533018B2

(12) United States Patent
Miwa et al.

(10) Patent No.: US 8,533,018 B2
(45) Date of Patent: Sep. 10, 2013

(54) SYSTEM FOR CONSTRUCTION MACHINE MAINTENANCE BASED ON PREDICTED SERVICE LIFE

(75) Inventors: Hirobumi Miwa, Hiratsuka (JP); Tadashi Taninaga, Hiratsuka (JP); Koutarou Hori, Hiratsuka (JP); Ichio Ichikawa, Hiratsuka (JP)

(73) Assignee: Komatsu Ltd., Tokyo (JP)

(*) Notice: Subject to any disclaimer, the term of this patent is extended or adjusted under 35 U.S.C. 154(b) by 1133 days.

(21) Appl. No.: 11/992,535

(22) PCT Filed: Sep. 29, 2006

(86) PCT No.: PCT/JP2006/319516
§ 371 (c)(1),
(2), (4) Date: Apr. 10, 2008

(87) PCT Pub. No.: WO2007/037400
PCT Pub. Date: Apr. 5, 2007

(65) Prior Publication Data
US 2009/0259507 A1    Oct. 15, 2009

(30) Foreign Application Priority Data

Sep. 30, 2005    (JP) .................................. 2005-287613

(51) Int. Cl.
*G06Q 10/00*    (2012.01)
(52) U.S. Cl.
USPC ........................ 705/7.13; 705/7.22; 705/305
(58) Field of Classification Search
USPC ....................... 705/7.13, 7.22, 305
See application file for complete search history.

(56) References Cited

U.S. PATENT DOCUMENTS 4,442,494 A * 4/1984 Fromson et al. ................ 702/34
4,796,206 A * 1/1989 Boscove et al. ................ 701/99
(Continued)

FOREIGN PATENT DOCUMENTS

JP    11036381 A * 2/1999
JP    11-211622 A    8/1999
(Continued)

OTHER PUBLICATIONS

Kobbacy, Kah et al., The development of a hybrid intelligent maintenance optimisation system (HIMOS) Journal of Operational Research Society, Vo. 52, 2011.*

(Continued)

*Primary Examiner* — Scott L Jarrett
(74) *Attorney, Agent, or Firm* — Posz Law Group, PLC

(57) ABSTRACT

To predict the service life of a construction machine more accurately, and to make it possible to draw up an appropriate overhaul implementation plan at an early stage.

A first service life prediction unit 311 predicts the service lives of main components such as an engine and the like, based upon their actual wear states. And a second service life prediction unit 312 predicts the service lives of the same components, based upon their cumulative load amounts. An order setting unit 320 selects the ones of these two predicted service lives which are the shorter, and sets a priority order for overhaul in order of shortness of predicted service life. An overhaul schedule table generation unit 330 creates a schedule table D1 based upon this priority order. The contents of this schedule table D1 are decided upon by a judgment unit 340, and, if necessary, are corrected by a correction unit 341. And a plan creation unit 350 creates an overhaul implementation plan document D2 and the like, based upon the corrected schedule table D1*a*. The result of the overhaul task and the present states of components are tested, and these test results are reflected by the service life prediction units 311 and 312.

8 Claims, 19 Drawing Sheets

(56) References Cited

U.S. PATENT DOCUMENTS

| | | | | |
|---|---|---|---|---|
| 5,081,598 | A | * | 1/1992 | Bellows et al. ............... 702/184 |
| 5,132,920 | A | * | 7/1992 | Bellows et al. ............... 702/184 |
| 5,343,387 | A | * | 8/1994 | Honma et al. ............... 705/7.14 |
| 5,355,444 | A | * | 10/1994 | Chirico .......................... 706/45 |
| 5,447,059 | A | * | 9/1995 | Miller et al. ............... 73/112.03 |
| 5,566,092 | A | * | 10/1996 | Wang et al. ................... 702/185 |
| 5,602,761 | A | * | 2/1997 | Spoerre et al. ............... 702/179 |
| 5,859,596 | A | * | 1/1999 | McRae .................... 340/870.02 |
| 6,067,486 | A | * | 5/2000 | Aragones et al. ............... 701/29 |
| 6,105,003 | A | * | 8/2000 | Morohashi et al. .......... 705/26.8 |
| 6,141,629 | A | * | 10/2000 | Yamamoto et al. ........... 702/187 |
| 6,195,602 | B1 | * | 2/2001 | Hazama et al. ................. 701/48 |
| 6,334,085 | B1 | * | 12/2001 | Kawamura et al. ........... 701/115 |
| 6,343,236 | B1 | * | 1/2002 | Gibson et al. .................... 700/79 |
| 6,343,251 | B1 | * | 1/2002 | Herron et al. ................. 701/100 |
| 6,347,267 | B1 | * | 2/2002 | Murakami ...................... 701/35 |
| 6,349,252 | B1 | * | 2/2002 | Imanishi et al. ............... 701/50 |
| 6,370,454 | B1 | * | 4/2002 | Moore ........................... 701/29 |
| 6,408,258 | B1 | * | 6/2002 | Richer ........................... 702/182 |
| 6,435,018 | B1 | * | 8/2002 | Murakami et al. ......... 73/114.01 |
| 6,477,452 | B2 | * | 11/2002 | Good ............................ 701/29.3 |
| 6,614,882 | B1 | * | 9/2003 | Beamon et al. ............ 379/27.01 |
| 6,625,403 | B2 | * | 9/2003 | Carling et al. .................. 399/24 |
| 6,625,539 | B1 | * | 9/2003 | Kittell et al. .................. 701/213 |
| 6,684,136 | B2 | * | 1/2004 | Sinex ............................ 701/29 |
| 6,832,175 | B2 | * | 12/2004 | Adachi et al. ................. 702/177 |
| 6,832,205 | B1 | * | 12/2004 | Aragones et al. ............ 705/7.25 |
| 6,845,148 | B1 | * | 1/2005 | Beamon ...................... 379/9.02 |
| 6,853,951 | B2 | * | 2/2005 | Jarrell et al. .................. 702/181 |
| 6,870,900 | B1 | * | 3/2005 | Beamon ...................... 379/9.03 |
| 6,892,317 | B1 | * | 5/2005 | Sampath et al. ............... 714/4.3 |
| 6,907,384 | B2 | * | 6/2005 | Adachi et al. ................. 702/184 |
| 6,944,572 | B2 | * | 9/2005 | Ushiku et al. ................. 702/181 |
| 6,968,293 | B2 | * | 11/2005 | Wiegand ....................... 702/184 |
| 7,016,774 | B2 | * | 3/2006 | Barber et al. ................... 701/30 |
| 7,124,059 | B2 | * | 10/2006 | Wetzer et al. ................. 702/184 |
| 7,206,719 | B2 | * | 4/2007 | Lindsay et al. ............... 702/177 |
| 7,266,518 | B2 | * | 9/2007 | Klim et al. ...................... 705/28 |
| 7,277,862 | B1 | * | 10/2007 | Adgaonkar et al. .......... 705/7.25 |
| 7,356,393 | B1 | * | 4/2008 | Schlatre et al. ................. 701/33 |
| 7,370,001 | B2 | * | 5/2008 | Harris .......................... 705/7.25 |
| 7,457,785 | B1 | * | 11/2008 | Greitzer et al. ................. 706/12 |
| 7,523,182 | B2 | * | 4/2009 | Godwin ........................ 709/223 |
| 7,548,802 | B2 | * | 6/2009 | Avery et al. ..................... 701/35 |
| 7,580,847 | B2 | * | 8/2009 | Black et al. ................... 705/7.22 |
| 7,653,717 | B2 | * | 1/2010 | Tomita .......................... 709/224 |
| 7,783,507 | B2 | * | 8/2010 | Schick et al. ................. 705/7.11 |
| 7,865,090 | B2 | * | 1/2011 | Katoh ............................. 399/24 |
| 7,894,938 | B1 | * | 2/2011 | Arora et al. ................... 700/241 |
| 7,921,000 | B2 | * | 4/2011 | Ohkura et al. ................... 703/7 |
| 7,949,740 | B2 | * | 5/2011 | Scrafford et al. ............. 709/223 |
| 7,987,108 | B2 | * | 7/2011 | Wetzer et al. ................. 705/7.12 |
| 8,212,673 | B1 | * | 7/2012 | Whittaker .................. 340/572.1 |
| 2002/0032511 | A1 | | 3/2002 | Murakami et al. |
| 2003/0033178 | A1 | | 2/2003 | Black et al. |
| 2004/0102927 | A1 | * | 5/2004 | Yu et al. ......................... 702/184 |
| 2004/0193467 | A1 | * | 9/2004 | Williams et al. .................. 705/8 |
| 2005/0038579 | A1 | * | 2/2005 | Lewis ............................ 701/29 |
| 2005/0065842 | A1 | * | 3/2005 | Summers ....................... 705/11 |
| 2006/0020402 | A1 | * | 1/2006 | Bischoff et al. ................. 702/34 |
| 2007/0016496 | A1 | * | 1/2007 | Bar et al. ........................ 705/28 |
| 2007/0162163 | A1 | * | 7/2007 | Steinhilper ..................... 700/32 |

FOREIGN PATENT DOCUMENTS

| | | |
|---|---|---|
| JP | 2000-297443 A | 10/2000 |
| JP | 2002-173954 A | 6/2002 |
| JP | 2003-119831 A | 4/2003 |
| SE | EP1777647 A1 * | 4/2007 |
| WO | WO 02/18879 | 3/2002 |
| WO | WO 2005/106139 A1 | 11/2005 |

OTHER PUBLICATIONS

Kobbacy, Khairy A. et al., Towards an Intelligent Maintenance Optimization System Journal of the Operational Research Society, vol. 46, 1995.*

Silver, Edward A. et al., A simple case of preventitive maintenance decision making with limited historical data International Journal of Production Economics, vol. 27, No. 3, Oct. 1992, Abstract.*

Gopalakrishnan, Mohan et al., Maximizing the Effectiveness of a Preventitive Maintenance System: An Adpative Modeling Approach, Management Science, vol. 43, No. 6, Jun. 1997.*

Percy, David A. et al., Setting preventive maintenance schedules when data are sparse International Journal of Production Economics, vol. 51, 1997.*

Mann, Lawrence et al., Statisctical-based or condition-based preventitive maintenance? Journal of Quality in Maintenance Engieering, vol. 1, No. 1, 1995.*

Christer, A.H. et al., An Operational Research Approach to Planned Maintenance: Modeling P.M. For a Vehicle Fleet Journal of Operational Research Society, vol. 35, No. 11, 1984.*

Langan, George, Maintenance automation: Out of the broom closet and into the boardroom IIE Solutions, vol. 27, No. 7, Jul. 1995.*

Patton, Joseph et al., Service Management Principles and Practices—Third Edition Instrument Society of America, 1994, ISBN 1-55617-4918.*

Schnexnayder, Cliff et al., Effect of Truck Payload Weight on Production Journal of Construction Engineering and Management, Jan./Feb. 1999.*

Katzel, Jeanine, Maintenance Management Software Plant Engineering, vol. 41, Jun. 18, 1987.*

Iglesias, Jose, Maintenance Planning Made Eady Enginering & Automation, No. 5, 1996.*

MXI.com Web Pages—Maintenix for Aviation MXI, Nov. 1998; Retreived from Archive.org Mar. 8, 2007.*

Chinnam, Patna Babu et al., A neuro-fuzz approach for estimating mean residual life in condition-based maintenance systems, International Journal Materials and Product Technology, vol. 20, No. 1-3, 2004.*

Golosinksi, Tad S. et al., Data mining VIMS data for information on truck condition, APCOM 2001.*

Greitzer, Frank L. et al., Predicting Remaining Life of Mechanical Systems Intelligent Ship Symposium IV, Apr. 2-3, 2001.*

Greitzer, Frank L. et al., Development of a Frameworkf for Predicting Life of Mechanical Systems International Society of Logistics (SOLE) 1999 Symposium, Aug. 30-Sep. 2, 1999.*

Kumar, Venkatesan S. et al., Evaluation of Residual Service Life methodologies using refurbishment projects as case studies Third International Conference on Transformative Project and Program Management, 2006.*

Lee, Jay et al., Intelligent prognostics tools and e-maintenance Computers in Industry, vol. 57, 2006.*

Office Action dated May 1, 2012 in corresponding Canadian Application No. 2,623,640.

* cited by examiner

| operational data (trend data) |||||||
|---|---|---|---|---|---|
| SMR | blow-by pressure | fuel injection amount | engine rotational speed | engine oil pressure | ... |
| SMR1 | BP1 | q1 | r1 | op1 | ... |
| SMR2 | BP2 | q2 | r2 | op2 | ... |
| ... | ... | ... | ... | ... | ... |

(b) T12

| load data | | | | | | |
|---|---|---|---|---|---|---|
| | engine rotational speed |||||| 
| fuel injection amount | | 0−N1 | −N2 | −N3 | −N4 | −N5 | ... |
| | 0−q1 | K11 | K21 | K31 | K41 | K51 | ... |
| | −q2 | K12 | K22 | K32 | K42 | K52 | ... |
| | −q3 | K13 | K23 | K33 | K43 | K53 | ... |
| | −q4 | K14 | K24 | K34 | K44 | K54 | ... |
| | −q5 | K15 | K25 | K35 | K45 | K55 | ... |
| | ... | ... | ... | ... | ... | ... | ... |

FIG. 5 fault history management data (T13)

| identification number | time instant of issue | SMR | fault code | contents | return time instant | controller | number of cases | ... |
|---|---|---|---|---|---|---|---|---|
| M001 | 2005/m/d... | SMR1 | code1 | fuel sensor system anomaly | 2005/m/d... | T/M | 1 | ... |
| M001 | 2005/m/d... | SMR2 | code2 | exhaust temperature anomaly | 2005/m/d... | VHMS | 3 | ... |
| ... | ... | ... | ... | ... | ... | ... | ... | ... |

| name of task | task details | time period for task |
|---|---|---|
| standard man-hour table data (type of device: MT1) |||
| complete engine O/H | task 1 | 2h |
| | task 2 | 0.5h |
| | ... | ... |
| | task n | 1h |
| complete transmission O/H | task 1 | 1.5h |
| | task 2 | 2h |
| | ... | ... |
| | task n | 1h |
| ... |||

FIG. 9 task process table — T23

| management number | date of receipt | model | machine number | user name | name of task | state of component preparation | task state of progress | time schedule |
|---|---|---|---|---|---|---|---|---|
| 1 | | | | | | | | ↕ |
| 2 | | | | | | | | ↑ |
| 3 | | | | | | | | ↕ |

SYSTEM FOR CONSTRUCTION MACHINE MAINTENANCE BASED ON PREDICTED SERVICE LIFE

TECHNICAL FIELD

The present invention relates to a construction machine maintenance work management system for construction machinery or the like.

BACKGROUND ART

A system has been suggested (in Patent Document #1) which collects information related to the working time period of a construction machine via wireless communication, and which urges the user to perform maintenance of a component whose maintenance time has arrived, if the cumulative working time period has arrived at a time which has been determined in advance by a maintenance plan. With the technique described in this document, whether or not to maintain each component is determined according to the cumulative working time period of the construction machine.

However there are individual discrepancies in wear state due to, for example, the field environment in which the construction machine is used, the nature of actuation by the operator, the relative weight of the load, and so on. Accordingly, simply determining the maintenance timing only according to the value of the cumulative operating time period is not economic. Thus, a technique has been suggested (in Patent Document #2) for determining the timing of maintenance tasks by monitoring the amount of the load which is imposed upon the construction machine.

Patent Document #1: Japanese Laid-Open Patent Publication 2003-119831

Patent Document #2: Japanese Laid-Open Patent Publication Heisei 11-211622

SUMMARY OF THE INVENTION

Problem to be Solved by the Invention

With the technique described in said second document, the cumulative load amount imposed upon the engine of the construction machine is calculated for each stage of engine rotational speed, and the service life of that engine is predicted by comparison with service life characteristics which are obtained in advance. However, even hypothetically supposing that construction machines of the same type have almost the same cumulative load amounts, due to causes such as the details of their tasks and their environment of use and so on, there are various discrepancies with regard to the extent of the individual damage which construction machines suffer in concrete terms.

Accordingly, it is difficult to predict the service life of a construction machine accurately based upon the cumulative load amount. Due to discrepancies in individual environment which occur between individual construction machines in concrete terms, while there are some construction machines in which a failure occurs earlier than the service lives which have been predicted from their cumulative load amounts, there are also construction machines which operate longer than their predicted service lives.

If the accuracy of service life prediction is low, then it is not possible to set the maintenance timings for the main components in an appropriate manner. Due to this, if for example a fault or the like has occurred in the construction machine earlier than its predicted service life, then the procurement and transportation of components is not on time, and the inactive period of the construction machine increases, so that the productivity of its user decreases.

Moreover, when the accuracy of prediction of service life is low, then sometimes the maintenance timings of a large number of construction machines occur together, so that the working capability of the maintenance workplace is exceeded; and, due to this, there may be a shortage of work personnel or the like, in which case the time periods required for maintenance tasks become long. The longer that the time periods required for maintenance tasks become, the longer do the inactive periods of the construction machines become, so that the user productivity is decreased.

The object of the present invention is to provide a maintenance work management system for a construction machine with which it is arranged, by prediction calculations of a plurality of types based upon parameters of a plurality of types, to be able to predict an individual service life for the construction machine, and thereby to be able to set the maintenance timing more accurately. Another objective of the present invention is to provide a maintenance work management system for a construction machine, with which it is arranged to be able to reflect concrete differences in the actual environment of the individual construction machine in respective prediction calculations of a plurality of types, and thereby to be able to improve the service life prediction accuracy. Yet another objective of the present invention is to provide a maintenance work management system for a construction machine which can be applied, even if construction machines which are equipped with devices which detect various types of state, and construction machines which are not equipped with such devices, are mixed together.

Means for Solving the Problem

According to an aspect of the present invention, a system which manages, between a plurality of construction machines, maintenance tasks for exchanging components installed to the construction machines, includes: a first service life prediction unit which predicts first service lives of said components, based upon changes of first parameters in which the wear states of said components are reflected; a second service life prediction unit which predicts second service lives of said components, based upon second parameters in which the cumulative load amounts of said components are reflected, and lifetime cumulative load amounts which are set in advance; and an order setting unit which sets an order for maintenance tasks between said plurality of construction machines by selecting, as the service lives of said components, the ones which are the shorter among said first predicted service lives and said second predicted service lives.

Furthermore, there may be further included a maintenance schedule generation unit which generates a maintenance schedule for said plurality of construction machines, based upon said priority order which has been set.

Moreover, there may be further included a correction unit which corrects said maintenance schedule by acquiring, from a data management unit, the states of components required for maintenance tasks for said plurality of construction machines, of a workforce, and of times required for tasks.

Yet further, there may be further included a plan creation unit which, if it is decided that there is no stock of some component required by said maintenance schedule, corrects said first service life and said second service life by changing the operating conditions of said construction machine, and creates a task plan for maintenance tasks.

Even further, said first service life prediction unit may predict said first service life by compensating a first basic service life which has been obtained from said first parameter according to a compensation coefficient which is obtained based upon test data for a previous old component which is exchanged with said component; and said second service life prediction unit may predict said second service life by compensating a second basic service life which has been obtained from said second parameter according to said compensation coefficient.

Still further, said first service life prediction unit: for a construction machine, among said plurality of construction machines, which is equipped with a state detection device which detects the state of said construction machine, may predict said first service life by acquiring said first parameter from data transmitted from said state detection device; and for a construction machine, among said plurality of construction machines, which is not equipped with such a state detection device, may predict said first service life by acquiring said first parameter from servicing history data which has been accumulated by a data management unit. And said second service life prediction unit: for a construction machine which is equipped with such a state detection device, may predict said second service life by acquiring said second parameter from data transmitted from said state detection device; and for a construction machine which is not equipped with such a state detection device, may predict said second service life by acquiring said second parameter from said servicing history data.

And, according to another aspect of the present invention, a system for managing maintenance tasks for exchanging components of a plurality of construction machines includes: a management center which is capable of communicating via a communication network with each of said plurality of construction machines, directly or indirectly; a computer terminal for maintenance, which is provided in a maintenance facility for performing maintenance tasks for each of said plurality of construction machines, and which is connected to said management center via said communication network so as to be capable of communicating therewith; a computer terminal for analysis, which is provided in an analysis facility for performing analysis of the state of each of said plurality of construction machines, and which is connected to said management center via said communication network so as to be capable of communicating therewith; and a state detection device which detects the state of at least one construction machine among said plurality of construction machines, and transmits said state to said management center. Said management center includes: a first data management unit for acquiring and storing data related to the states of each of said plurality of construction machines from said computer terminal for maintenance, said computer terminal for analysis, and said state detection device; a second data management unit for storing the states of components required for maintenance tasks for said plurality of construction machines, of a workforce, and of the time periods for tasks; a first service life prediction unit which predicts first service lives of said components, based upon first parameters in which the wear states of said components are reflected; a second service life prediction unit which predicts second service lives of said components, based upon second parameters in which the cumulative load amounts of said components are reflected; an order setting unit which sets an order for maintenance tasks of said components by selecting, as the service lives of said components, the ones which are the shorter among said first predicted service lives and said second predicted service lives; a maintenance schedule generation unit which generates a maintenance schedule for said components, based upon said priority order which has been set; and a correction unit which corrects said maintenance schedule by acquiring, from said second data management unit, the states of said components required for maintenance tasks for said plurality of construction machines, of the workforce, and of times required for tasks.

Moreover, said first service life prediction unit, for a construction machine among said plurality of construction machines which is equipped with said state detection device, predicts said first service life by acquiring said first parameter from data transmitted from said state detection device; and, for a construction machine among said plurality of construction machines which is not equipped with said state detection device, predicts said first service life by acquiring said first parameter from servicing history data which has been accumulated by said first data management unit; and said second service life prediction unit, for a construction machine which is equipped with said state detection device, predicts said second service life by acquiring said second parameter from data transmitted from said state detection device; and, for a construction machine which is not equipped with said state detection device, predicts said second service life by acquiring said second parameter from said servicing history data.

BRIEF DESCRIPTION OF THE DRAWINGS

FIG. 4 is an explanatory figure showing operational data and load data;

FIG. 5 is an explanatory figure showing fault history management data;

FIG. 7 is an explanatory figure showing a standard process table;

FIG. 9 is an explanatory figure showing a task process table;

EXPLANATION OF THE REFERENCE SYMBOLS

1 . . . management center, 2 . . . place of work, 3 . . . maintenance workplace, 4 . . . analysis center, 5 . . . user business, 6 . . . distributor, 11 . . . machine management device server, 11A . . . storage device, 11B . . . communication unit, 12 . . . head office server, 12A . . . storage device, 12B . . . communication unit, 21 & 22 . . . construction machine, 23 . . . computer terminal for maintenance, 31 . . . computer terminal for maintenance, 41 . . . computer terminal for analysis, 51 . . . user terminal, 61 . . . distributor terminal, CN1 & CN2 . . . communication network, CN3 . . . internal network, 100 . . . machine management device, 101 . . . controller, 102 . . . storage unit, 103 . . . communication unit, 201 . . . service meter, 202 . . . transmission controller, 203 . . . engine controller, 204 . . . load amount monitoring unit, 206 . . . transmission, 207 . . . sensor group for engine control, 208 . . . engine, 209 . . . load amount related sensor, 300 . . . logic unit, 311 . . . first service life prediction unit, 312 . . . second service life prediction unit, 320 . . . overhaul order setting unit, 330 . . . overhaul schedule table generation unit, 340 . . . overhaul schedule table judgment unit, 341 . . . correction unit, 350 . . . overhaul plan creation unit, 360 . . . overhaul implementation unit, 370 . . . test unit, 380 . . . test result judgment unit, A1 & A2 . . . gradient compensation coefficient, F0 . . . design lifetime load amount, G1 & G2 . . . load coefficient, H1 & H3 . . . time instant that blow-by pressure reaches warning value LCL, H2 & H4 . . . time instant that blow-by pressure reaches limit value UCL (reference service life), L1 & L2 . . . predicted service life, M . . . remaining service life;

P . . . prediction logic unit compensation coefficient, S1, S2 . . . maintenance coefficient, SMR . . . service meter value, D1 . . . overhaul schedule table, D1a . . . corrected schedule table, D2 . . . overhaul implementation plan document, D3 . . . estimate, T11 . . . operational data, T12 . . . load data, 112A . . . index map, 112B . . . calculation result data, T12C . . . table for acquiring load coefficient G2, T13 . . . fault history management data, T14 . . . analysis result data, 114A . . . oil analysis result report document, 114B . . . test result sheet, T15 . . . periodic servicing register (servicing history data), T21 . . . stock list;

T22 . . . list of required components, T22A . . . detailed component list, T23 . . . process table, T24 . . . standard man-hour table, T31 . . . maintenance coefficient calculation table, T32 . . . decision table, T33 . . . prediction logic unit compensation coefficient map, T34 . . . order table.

PREFERRED EMBODIMENT FOR IMPLEMENTATION OF THE INVENTION

Figure 1:
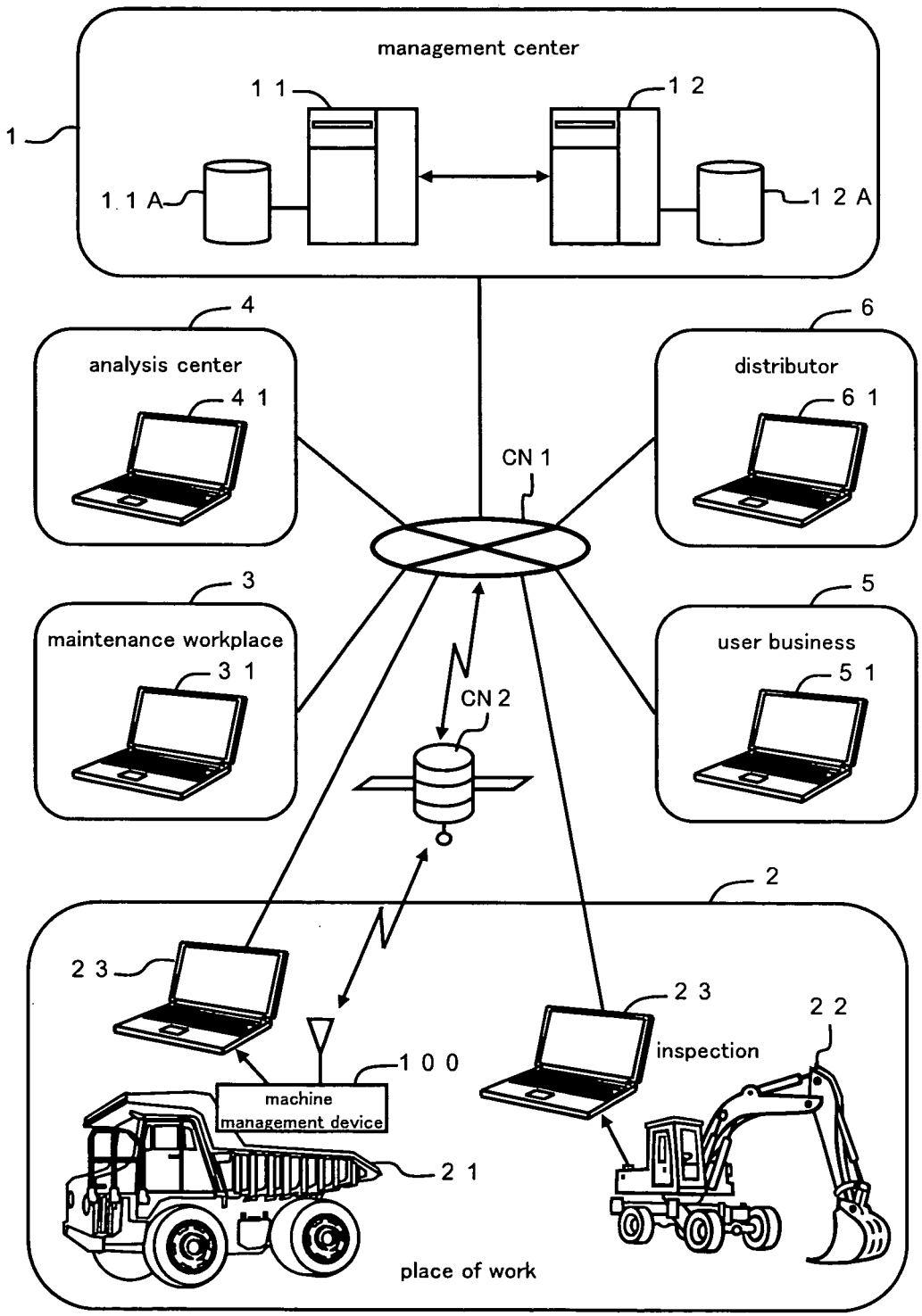
FIG. 1 is an explanatory figure showing the overall structure of a construction machine maintenance work management system according to an embodiment of the present invention.

FIG. 1 is an explanatory figure showing an overall summary of a construction machine maintenance work management system according to an embodiment of the present invention. In the following, a case will be explained of application to construction machines such as, for example, hydraulic shovels or dump trucks, as examples of construction machines.

This system can be set up by, for example, mutually connecting together a plurality of facilities 1, 2, 3, 4, 5, and 6 via communication networks CN1 and CN2. A management center 1 collects and manages information related to construction machines 21 and 22. This management center 1 comprises a machine management device server 11 and a head office server 12. Although the details of each of these servers 11 and 12 will be described hereinafter, various types of data related to, for example, the operational states of the construction machines 21 and 22, results of analysis of components, and so on are accumulated in a storage device 11A of the machine management device server 11. And, for example, in the storage device 12A of the head office server 12, there are accumulated various types of data related to material resources and human resources required for maintenance tasks, such as the presence or absence of components for exchange and their delivery times, task processing by maintenance personnel, and the like. Moreover, as will be described in detail hereinafter, the machine management device server 11 supplies services for prediction calculation of various different types of service life, based upon a plurality of different types of parameters.

A plurality of construction machines 21 and 22 are disposed in a place of work 2. A machine management device 100 is mounted to one of these construction machines 21. Although this will be described in detail hereinafter, the machine management device 100 automatically collects data related to the operational state of the construction machine 21 and so on, and transmits it to the machine management device server 11. No such machine management device 100 is mounted to the other construction machine 22, but various types of data related to this construction machine 22 can be transmitted to the machine management device server 11 via a computer terminal for maintenance 23.

The maintenance workplace 3 performs maintenance tasks upon the construction machines 21 and 22. For example, overhaul tasks are one type of maintenance task. In the maintenance workplace 3, overhaul tasks for the construction machines 21 and 22 are performed using main component units such as, for example, engines, transmissions, hydraulic pumps, and the like. For example, when performing an engine overhaul, another engine which has been already prepared is exchanged in. And the engine which has been removed is taken apart, its individual components are inspected for wear and damage, certain individual components are exchanged for new ones, and then the engine is reassembled. And then it is retained for use as a replacement for the next engine which needs to be overhauled. The various individual components which have been removed due to wear or damage, such as cylinders, pistons, the crank shaft and the like are tested by wear measurement or visual inspection, and the results of this inspection are transmitted from the computer terminal for maintenance 31 via the communication network CN1 to the management center 1, and are accumulated in the machine management device server 11.

The analysis center is a facility which performs, for example, analysis and so on of oil which has been taken from the construction machines 21 and 22. The results of this analysis are transmitted from the computer terminal for analysis 41 via the communication network CN1 to the management center 1, and are accumulated in the machine management device server 11.

The user business 5 is the user of the construction machines 21 and 22, and, for example, information and the like which is suggested from a computer terminal 61 of an distributor 6 is inputted into the computer terminal 51 of this user business 5. One type of such suggested information may be an overhaul implementation plan document and so on which will be described hereafter.

The life prediction service which the machine management device server 11 supplies to, for example, the distributor terminal 61 or the user terminal 51 may be either of two types of service life which are calculated based upon two types of prediction algorithm, and it is arranged to use that one of these service lives which is the shorter.

One of these prediction algorithms predicts a first service life for a component based upon a first parameter in which the wear state of the component is reflected. Since this prediction algorithm predicts the service life based upon the actual wear state, it may also be termed the result based prediction algorithm. The other of these prediction algorithms predicts a second service life for a component based upon a second parameter which reflects the cumulative load amount upon the component. Since this prediction algorithm predicts the service life based upon the load which has been imposed upon the component, it may also be termed the cause based prediction algorithm.

If the main component which is to be the subject of exchange is an engine, then, to cite an example, the first parameter may be change of blow-by pressure. And the second component may, to cite an example, be engine fuel consumption amount. Apart from these, to cite other examples, the first parameter may be the stall conditions of a torque converter, the change over time of the compression of an engine, and the like. And, to cite other examples, the second parameter may be thermal deterioration or thermal fatigue of various individual components, stress fatigue, or the like.

By predicting the respective service lives of components from a plurality of different points of view in this manner, and by employing that service life which is the shortest, it is possible to reduce the possibility that a component may arrive at the end of its service life before the predicted service life. By doing this, it is possible to draw up an appropriate maintenance task plan, and to arrange for the required components and personnel quickly, and thus it is possible to implement smooth management. In the following, this embodiment will be explained in more detail.

Embodiment 1

Figure 2:
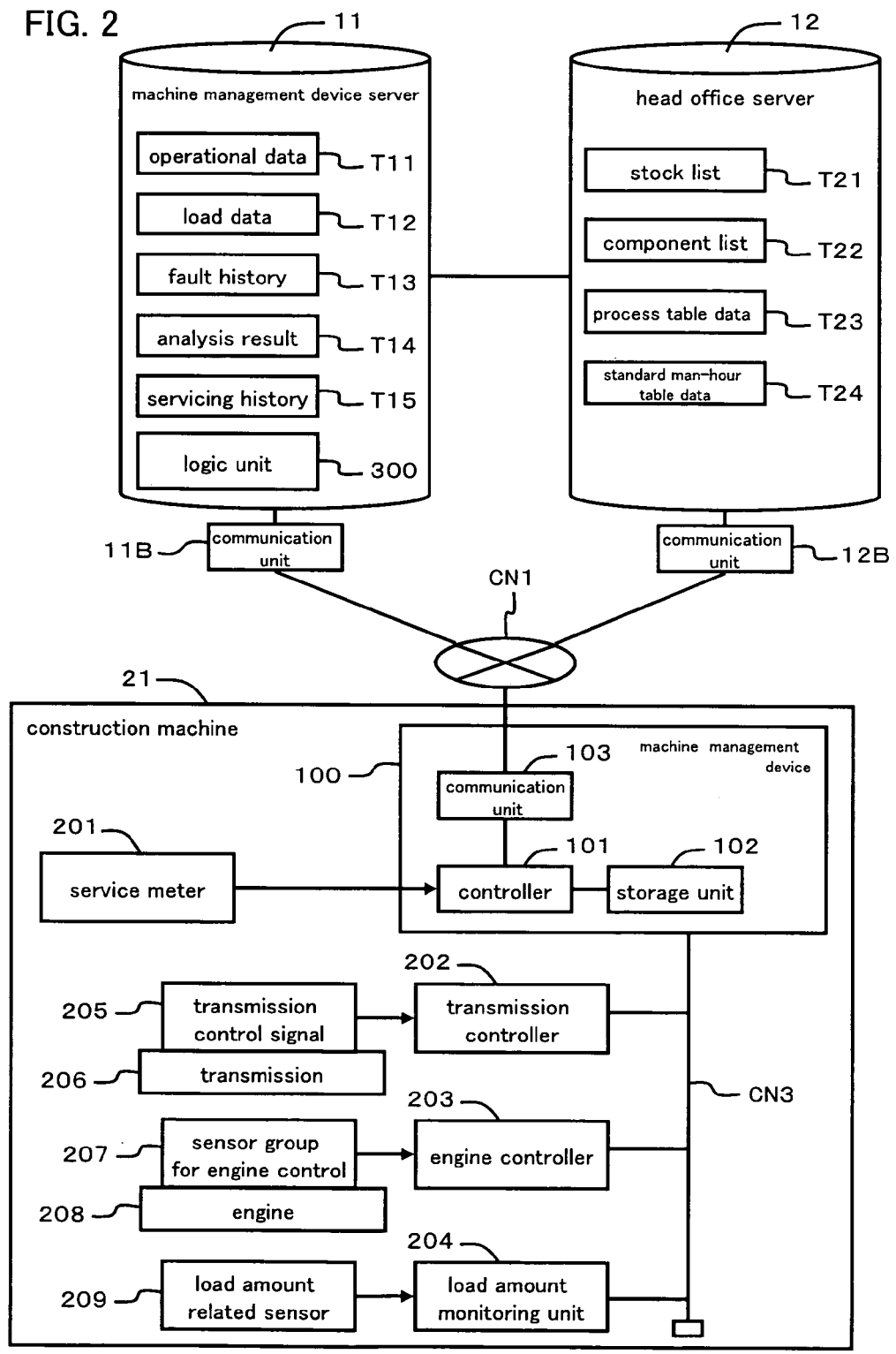
FIG. 2 is a block diagram showing the structures of a management center and of a construction machine.

FIG. 2 is a block diagram showing examples of the structures of the management center 1 and of the construction machine 21 in more detail. The machine management device server 11 can be connected to the communication network CN1 via a communication unit 11B, and collects information of various types from the place of work 2, the maintenance workplace 3, and the analysis center 4. For example, each of operational data T11, load data T12, fault history management data T13, analysis result data T14, servicing history data T15 and so on may be accumulated in the machine management device server 11. Moreover, the machine management device server 11 comprises a logic unit 300 for predicting respective service lives for the components, based upon prediction algorithms of a plurality of types. This logic unit 300 and the various types of data T11 and so on can be used from the computer terminal for maintenance 23, the distributor terminal 61, and so on.

The head office server 12 can be connected to the communication network CN1 via a communication unit 12B, and can supply information of various types to the maintenance terminal 23 and the terminal for maintenance 31 and so on. For example, a stock list data T21, a component list data T22, a process table data T23, a standard man-hour table data T24 and so on may all be stored in the head office server 12. It should be understood that the server structure of the management center 1 is not to be considered as being limited to the example described above. It would be possible to utilize more servers, or to manage all the information with one server. However, it is possible to build a flexible system by separating the system into the machine management device server 11 which manages the collection of field level data and the head office server 12 which manages the collection of management level data, with both of these servers cooperating.

The construction machine may be, for example, a dump truck or a wheel loader or the like, and may be equipped with a machine management device 100. And this machine management device 100 may be constituted by, for example, a computer device which comprises a controller 101, a storage unit 102, and a communication unit 103 and the like, and may be connected to various main portions of the construction machine 21 via an internal network CN3.

The controller 101 is connected to a service meter 201, and acquires the operating time period of the construction machine 21 from this service meter 201. Moreover, the controller 101 is connected to a transmission controller 202.

This transmission controller 202 is a device which controls a transmission 206 based upon a transmission control signal, and the controller 101 can acquire one or a plurality of items of information related to the transmission 206 from this transmission controller 202.

The engine controller 203 is a device which controls an engine 208 based upon detection signals from a sensor group for engine control 207. The controller 101 can acquire one or a plurality of items of information related to the engine 208 from this engine controller 203. As the sensor group for engine control 207, for example, a cooling water temperature sensor, a battery voltage sensor, a fuel amount sensor, or an engine rotational speed sensor or the like may be cited.

A load amount monitoring unit 204 is a device which monitors the weight of the load carried by the construction machine 21, based upon a detection signal from a load amount related sensor 209. The controller 101 is connected to this load amount monitoring unit 204, and is thereby able to acquire information such as the weight of the load and so on.

Figure 3:
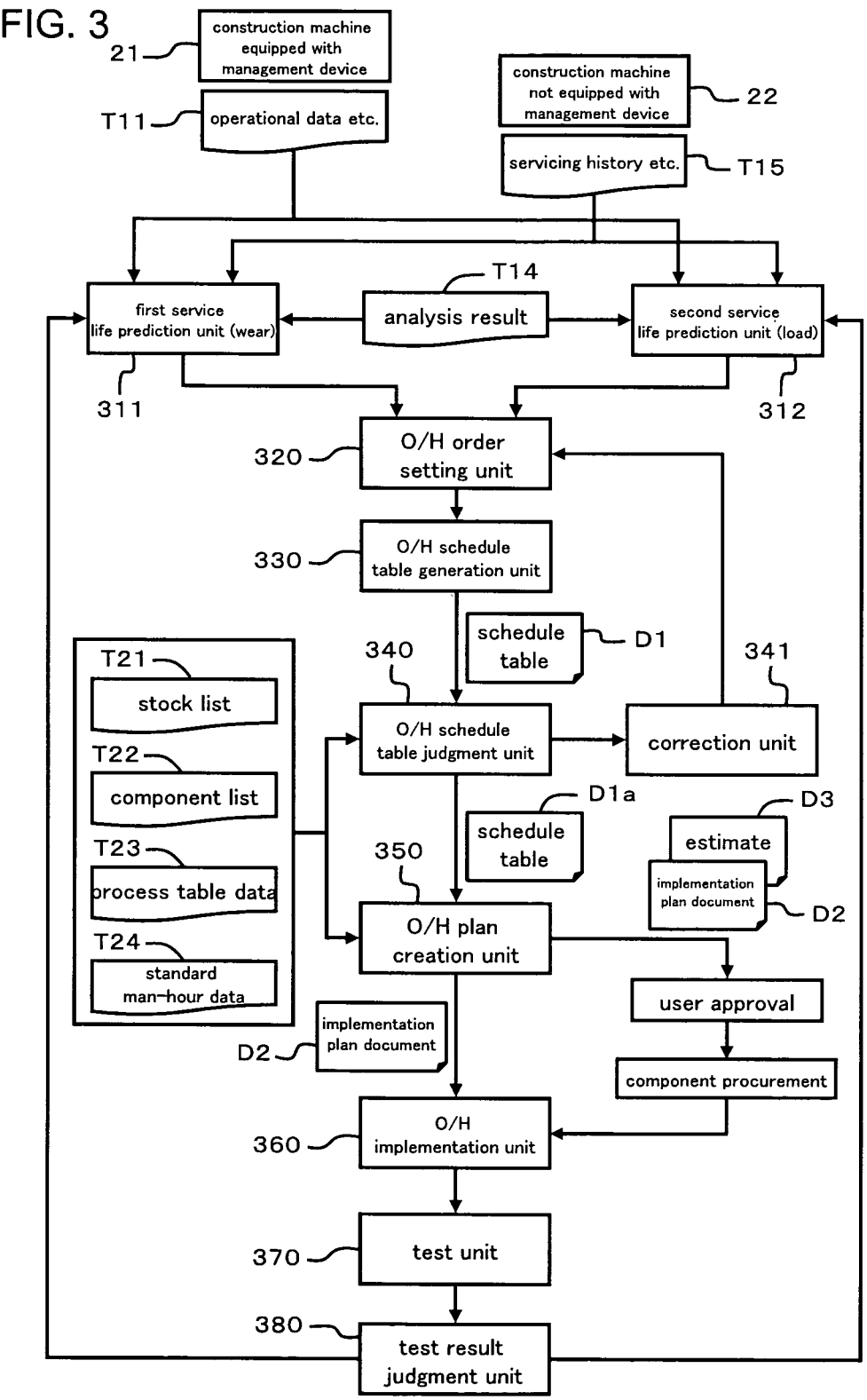
FIG. 3 is an explanatory figure schematically showing a process for predicting services lives of a plurality of types, and constructing an overhaul implementation plan.

Next, FIG. 3 is an explanatory figure schematically showing the functional structure of the logic unit 300 which predicts services lives of components, and so on. A first service life prediction unit 311, a second service life prediction unit 312, an overhaul order setting unit 320, an overhaul schedule table generation unit 330, an overhaul schedule table judgment unit 340, a correction unit 341, and an overhaul plan creation unit 350 are all functions which can be executed by a computer. And, apart from these, an overhaul implementation unit 360, a test unit 370, and a test result judgment unit 380 are portions which can be executed by a human being.

The operational data T11 and so on, which has been automatically collected from the construction machine 21 upon which the machine management device 100 is mounted, is inputted to both of the service life prediction units 311 and 312. As for the construction machine 22 upon which no such machine management device 100 is mounted, the servicing history data T15 and so on, which has been collected by the maintenance personnel and the like via the terminal 23, is inputted to both of the service life prediction units 311 and 312. Moreover, the analysis result data T14 is also inputted to both of the service life prediction units 311 and 312.

The first service life prediction unit 311 calculates the service life of a component based upon the actual state of wear and state of damage which have appeared upon that component, compensates this predicted service life based upon the load amount which has been applied to that component and upon a compensation coefficient and so on, and outputs the result as a first predicted service life. And the second service life prediction unit 312 predicts the service life of a component based upon the cumulative load amount which has been applied to that component, compensates this predicted service life based upon its most recent state of use and upon a compensation coefficient and so on, and outputs the result as a second predicted service life. Accordingly, both a first predicted service life and a second predicted service life are calculated for the same main component.

An overhaul (abbreviated in the figures as "O/H") order setting unit 320 selects that one of the first predicted service life and the second predicted service life from the service life prediction units 311 and 312 which is the shorter, and sets a priority order in which overhaul tasks are to be performed.

And, based upon the order which has been set, an overhaul schedule table generation unit 330 creates a schedule table D1 which shows which construction machine is to be overhauled and when. Moreover, an overhaul schedule table judgment unit 340 decides upon the contents of the schedule table D1, based upon stock list data T21, component list data T22, process table data T23, and standard man hour table data T24. For example, this judgment unit 340 may decide whether or not the initial schedule table D1 is appropriate, from the standpoint of procurement of components and allocation of personnel and so on. And, if the judgment unit 340 has decided that it is necessary to correct the schedule table D1, then a correction unit 341 corrects the schedule table D1 by changing the content of the task for some construction machine or the like.

For example, in a situation such as when there is no stock of some component for exchange, or when a certain time is needed to procure it, then, if the content of the task for that construction machine is made lighter, or its operating time period is shortened, then it is possible to make the service life of the component be longer than the predicted value, so that it will also be possible to meet the delivery time for the component. Thus the correction unit changes the operating conditions for that construction machine and corrects its predicted service life, and inputs these to the order setting unit 320. Due to this, the order setting unit 320 generates the schedule table D1 for a second time. This schedule table D1 which has been thus generated is decided upon for a second time by the judgment unit 340.

After repeating this correction procedure, the judgment unit 340 decides that the schedule table D1 is one which can be implemented. This schedule table which it has been decided can be implemented will be termed D1a. And, based upon this corrected schedule table D1a, a plan creation unit 350 determines the number of individual components to be exchanged and their price, and the details of the start timing and the end timing of the overhaul task and so on, and creates an implementation plan document D2 and an estimate D3. It should be understood that the function of the plan creation unit 350 may also be implemented by collaborative working between processing by a computer and by a human being.

When the implementation plan document D2 and the estimate D3 which have thus been created are approved by the user, procurement of the required components is performed. The components which have been thus ordered are delivered from a workshop or a warehouse to the maintenance workplace 3.

In the maintenance workplace 3, maintenance personnel are allocated and a process table is created, based upon the implementation plan document D2 which has been approved. And, when all of the required components have been collected together, an overhaul implementation unit 360 performs the task of overhauling the construction machine. It should be understood that although, as described above, it is possible to perform the task of overhauling the entire construction machine, it is often the case that a partial overhaul task is performed for a main component unit such as the engine or the transmission or the like thereof.

The old components which have been removed in the overhaul task are taken apart into individual components, each of which is tested by a test unit 370. And, based upon the test results for the individual components, a test result judgment unit 380 makes combined decisions related to the main components which are made up from these individual components. The results of these combined decisions are fed back to both of the service life prediction units 311 and 312, and thereby the prediction algorithms of these service life prediction units 311 and 312 are each corrected.

Next, the various types of data which are used in this system will be explained. First, FIG. 4 is an explanatory figure showing examples of the operational data T11 and the load data T12. In this embodiment, an example is shown in which a main component is taken as being an engine, of which the blow-by pressure and the fuel consumption amount are taken as being the parameters for predicting its service life.

FIG. 4(a) shows the operational data T11. "SMR" in the figure denotes the operating time period of the construction machine, which is outputted from the service meter 201. The operational data such as, for example, blow-by pressure, fuel consumption amount, engine rotational speed, engine oil pressure, and the like, is stored in correspondence to each operating time period. Accordingly, one record of operational data T11 specifies various states of the engine at some time instant (during one operating time period), and, based upon the operational data T11, it is possible to ascertain the change over time of the blow-by pressure and the fuel consumption amount and so on.

FIG. 4(b) shows the load data T12. This load data T12 breaks both the fuel injection amount and also the engine rotational speed into a plurality of steps, and, for each of the plurality of regions which are thus created, the frequency $K11, K12, \ldots K55$ at which it appears is stored as a ratio. In other words, the entire range of the fuel injection amount from its minimum value to its maximum value is broken into a plurality of unit ranges (0-q1, q1-q2, q2-q3, . . . ), and each of these unit ranges for fuel injection amount is divided up by breaking the entire range of engine rotational speed, from its minimum value to its maximum value into a plurality of unit ranges (0-N1, N1-N2, N2-N3, . . . ).

Accordingly, the number of regions which are created is equal to the product of the number of divisions of the entire range of the fuel injection amount, and the number of divisions of the entire range of the engine rotational speed. And the frequency of appearance K of each of these regions is calculated so that the sum of all of these frequencies of appearance of the regions becomes unity. Accordingly, the time frequency of operation in each operational region is given by this load data T12. In the case of a construction machine which is often operated at high load, the values of the frequencies K which appear near the lower right region of this table will be high. On the other hand, in the case of a construction machine which is often operated at low load, the values of the frequencies K which appear near the upper left region of this table will be high.

FIG. 5 is an explanatory figure showing an example of the fault history management data T13. This fault history management data T13 is data for managing the history of faults that have occurred in each of the main components of each of the construction machines.

This fault history management data T13 may consist of, for example, an identification number, a time instant of issue, a SMR, a fault code, fault details, a return time instant, a controller, number of cases, and so on, all in mutual correspondence. The fault history management data T13 is generated based upon information related to faults which is transmitted from the machine management device 100.

It should be understood that, in the case of the construction machine 22 to which no machine management device 100 is fitted, during a periodic inspection or the like, it is possible for maintenance personnel to read out the fault record from various controllers via a terminal, and to store this as the fault history management data T13.

The identification number is information for identifying each of the main components. The time instant of issue is the time instant that the fault occurred. The SMR is the output value of the service meter 201 at the point that the fault occurred. The fault code is information for identifying the type of the fault that has occurred. The details of the fault is information giving a summary of the fault that has occurred. The return time instant is the time instant that the fault was eliminated. The controller is information for identifying under the jurisdiction of which controller the fault has occurred. And the number of cases is the number of cases in which this fault has occurred.

Figure 6:
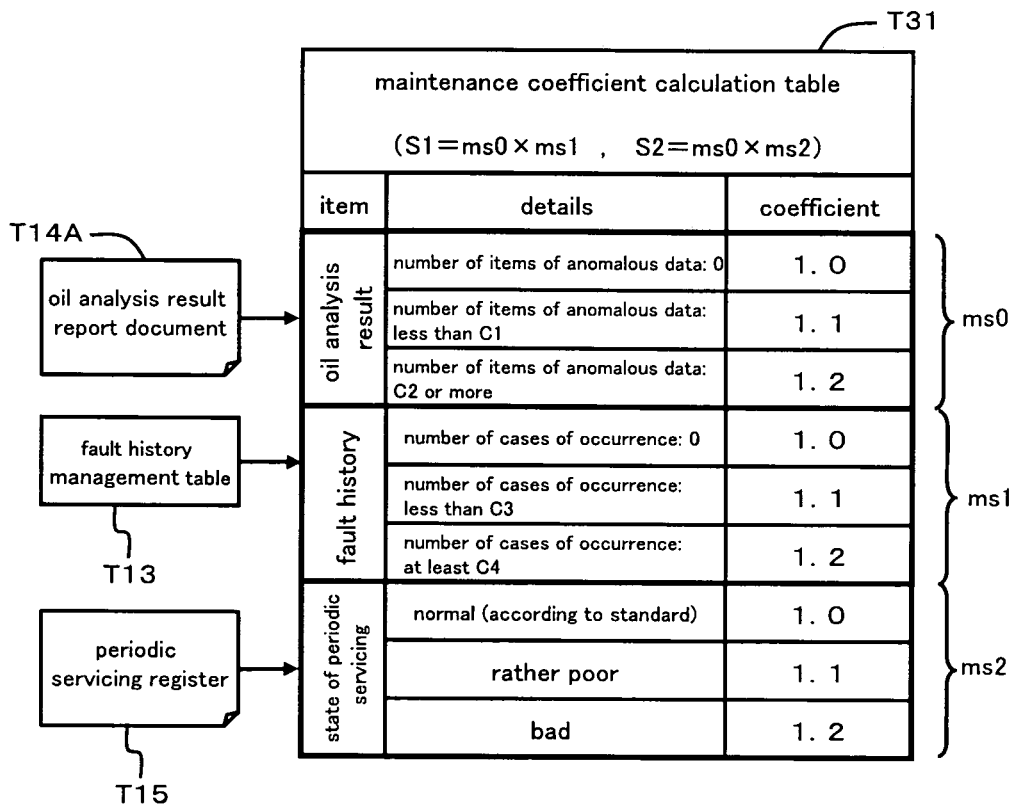
FIG. 6 is an explanatory figure showing a maintenance coefficient calculation table.

FIG. 6 is an explanatory figure showing an example of the maintenance coefficient calculation table T31. This table T31 is, for example, stored by the machine management device server 11, and is used by the logic unit 300. Maintenance coefficients S1 and S2 are coefficients which are obtained based upon the maintenance state of the construction machine, and these are used for compensating the predicted service life, as will be described hereinafter.

The maintenance coefficient calculation table T31 may, for example, include three types of information: oil analysis results, fault history, and the periodic servicing state.

The analysis of oil is performed by the analysis center 4. The results of analysis are sent to the management center 1 as an oil analysis result report document T14A, which is stored by the machine management device server 11. This report document T14A may be transmitted via the communication network CN1 as electronic data, or may also be sent upon a physical medium.

If the engine is worn or the like, the mixing ratio of metallic wear which is mixed into the engine oil is increased. The number of items of anomalous data is described in the oil analysis result report document T14A. The value of a first maintenance base coefficient ms0 is set in advance in the maintenance coefficient calculation table T31, according to this number of items of anomalous data. The smaller is the number of items of anomalous data, the smaller does the value of this base coefficient ms0 become (its minimum value is 1), and the larger is the number of items of anomalous data, the larger does the value of this base coefficient ms0 become.

The fault history is ascertained from the fault history management data T13 by the machine management device 100. The value of a second maintenance base coefficient ms1 is set in advance according to the number of cases of a fault which have occurred. The smaller is the number of cases of the fault which have occurred, the smaller does the value of this base coefficient ms1 become (its minimum value is 1), and the larger is the number of cases of the fault which have occurred, the larger does the value of this base coefficient ms1 become.

The state of periodic servicing is ascertained from the servicing record T15. Based upon the state which has been obtained during periodic servicing, for example, the servicing state may be divided into a plurality of stages "normal", "rather poor", or "bad". The value of a third maintenance base coefficient ms2 is set in advance for each of these stages. Its minimum value is 1. It should be understood—and this is the same in the explanation of the other tables—that how the values of these various base coefficients ms0, ms1, and ms2 are set, is not to be considered as being limited to the example shown in the figure.

Each of the maintenance coefficients is calculated by a different method by the construction machine 21 to which the machine management device 100 is fitted, and by the construction machine 22 to which no such device is fitted. In the case of the construction machine 21 to which the machine management device 100 is fitted, a maintenance coefficient S1 is used. This coefficient S1 is calculated by multiplying together the first maintenance base coefficient ms0 and the second maintenance base coefficient ms1 (S1=ms0×ms1). Moreover, in the case of the construction machine 22 to which no such machine management device 100 is fitted, if the fault history management is not sufficient, it can also be calculated by multiplying together the first maintenance base coefficient ms0 and the third maintenance base coefficient ms2 (S2=ms0×ms2).

FIG. 7 is an explanatory figure showing an example of the standard man-hour table data T24. This standard man-hour table T24 may, for example, be prepared for each type of construction machine. In the standard man-hour table T24, for each of the main components, the details of each individual task which is required for entirely overhauling this main component and the time period required for that task are kept in correspondence with one another. By referring to this standard man-hour table T24, it is possible to ascertain the standard time periods which are required for the overhaul tasks for any main component which is to be the subject of overhaul.

Figure 8:
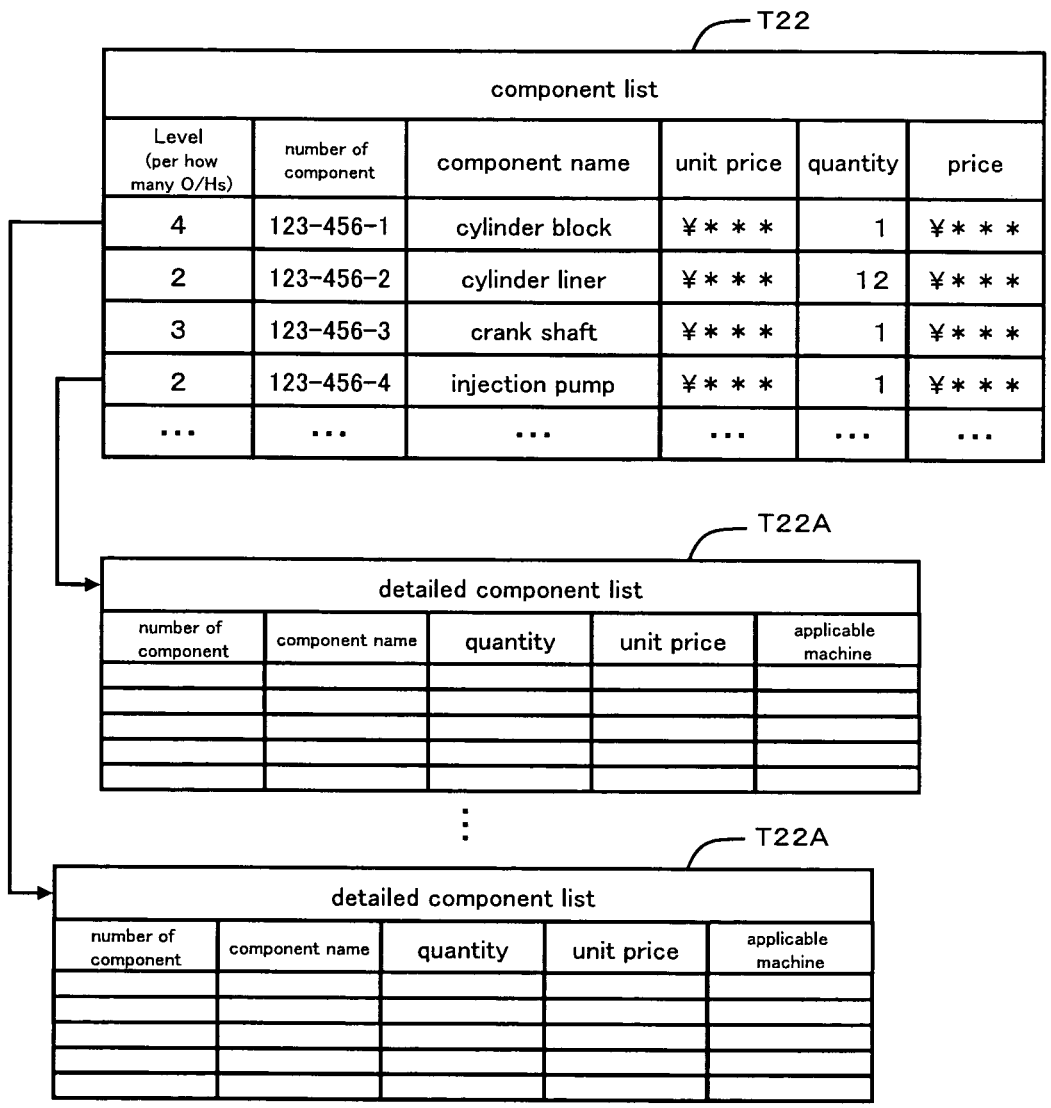
FIG. 8 is an explanatory figure showing a list of components which are required for an overhaul task.

FIG. 8 is an explanatory figure showing an example of a component list T22 which is used for an overhaul task. This component list T22 is prepared for each of the main components, and may include, for example, the overhaul level, component numbers, component names, unit prices, the quantity required, and the total cost.

By the level is mean per which number of overhaul tasks. In other words, the level specifies the exchange frequency of this component (per how many repetitions of the overhaul task). For example while, according to the durability of each component and so on, there are components which must be exchanged each time the overhaul task is performed, there also exist components which should be exchanged at a rate of once every four times, and so on. The number of components is information for identifying that individual component. The component name is the title of that individual component. To each individual component in the component list T22, there corresponds a respective detailed component list T22A. In the detailed component list T22A, there are registered a detailed group of components which make up that individual component.

FIG. 9 is an explanatory figure showing an example of the process table data T23. This process data table T23 is a table for managing the task situation in the maintenance workplace 3. The process data table T23 may, for example, consist of a management number for identifying the overhaul task, the day of receipt of the task, the type (i.e. the model) of the construction machine and its production number (the machine number), the name of the user of this construction machine, a title which denotes the details of the task, the state of component preparation, the state of progress of the task, and its time schedule, in mutual correspondence.

Figure 10:
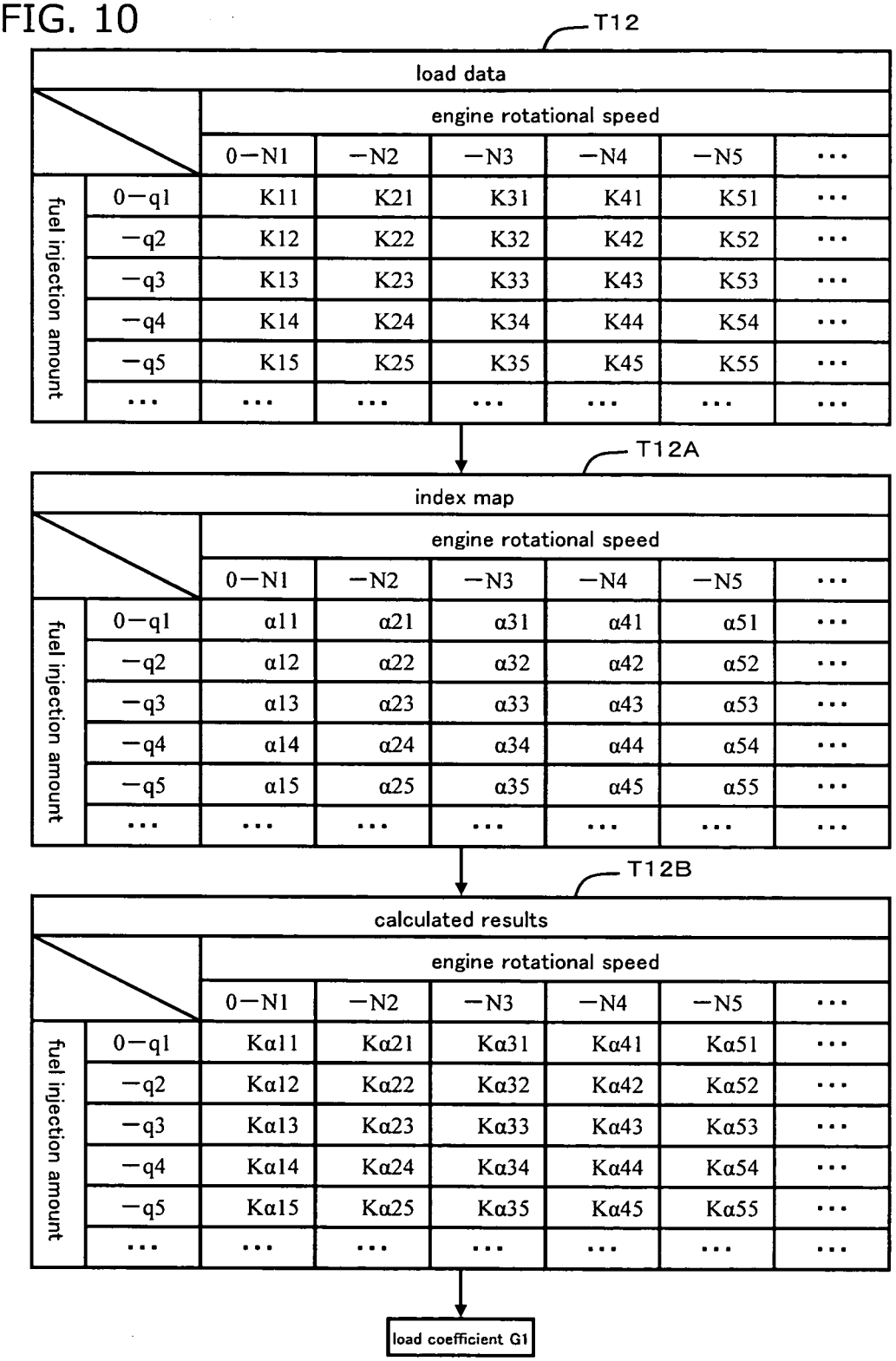
FIG. 10 is an explanatory figure showing a process for obtaining a load coefficient.

FIG. 10 is an explanatory figure showing a method for calculating a load coefficient G1. The load data T12, as described above, shows the frequency of each operational region, as divided up according to the fuel injection amount and the engine rotational speed. The more high load running a construction machine performs (at high engine rotational speed and high fuel injection amount), the greater is the extent of the damage and wear which its engine experiences.

Thus, an index map T12A which has a plurality of regions subdivided in a manner similar to that of the load data T12 is weighted at the frequency K of the load data T12. For example, if a high speed running time period is long, rotating portions and sliding portions can easily wear; and, if for example low speed running is performed up a long upward slope, then the time period at which the engine is exposed to high temperatures becomes long, and its pistons and the valves and so on experience an influence due to heat. In this manner, even if the fuel injection amount is the same, the locations which are influenced and the details of such influence may vary in different ways according to the engine rotational speed.

Accordingly, in the index map T12A, a load index $\alpha 11$, $\alpha 12 \ldots \alpha 55 \ldots$ is set for each operational region, in consideration of the magnitudes of rotation and sliding and thermal influence. Thus, calculated result data T12B is obtained for each operational region by multiplying together the frequency K at which its corresponding load data T12 appears, and its corresponding load index a in the index map T12A (K×α). And the load coefficient G1 is obtained by adding together the calculation results for all the operational regions. It should be understood that the index map T12A may be prepared according to the type of the engine and the exhaust amount, and the index a of each operational region may also be changed appropriately, according to requirements.

Figure 11:
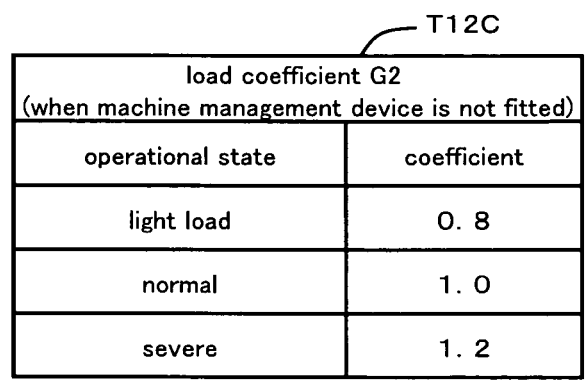
FIG. 11 is an explanatory figure showing a table for obtaining a load coefficient when no machine management device is equipped.

FIG. 11 is an explanatory figure showing an example of a coefficient discrimination table T12C which is used for acquiring another load coefficient G2. In the case of the construction machine 21 to which the machine management device 100 is fitted, the load coefficient G1 may be acquired based upon load data T12 which is totalized in real time. By contrast, in the case of the construction machine 22 to which no such machine management device 100 is fitted, the load data cannot be collected in real time.

Thus, in the table T12C, the operational state of the construction machine is classified into three stages, and a value of the load coefficient G2 is set in advance for each stage. The operational state of the construction machine 22 is determined according as to whether the fuel consumption amount is large or small, or empirically by visual inspection by the service personnel or the like. With the value in normal conditions being taken as 1, the value of the load coefficient G2 becomes smaller the lighter the load becomes, and the value of the load coefficient G2 becomes greater the heavier the load becomes. It should be understood that, in the following explanation, sometimes the load coefficient G1 is termed the "first load coefficient" and the load coefficient G2 is termed the "second load coefficient".

Figure 12:
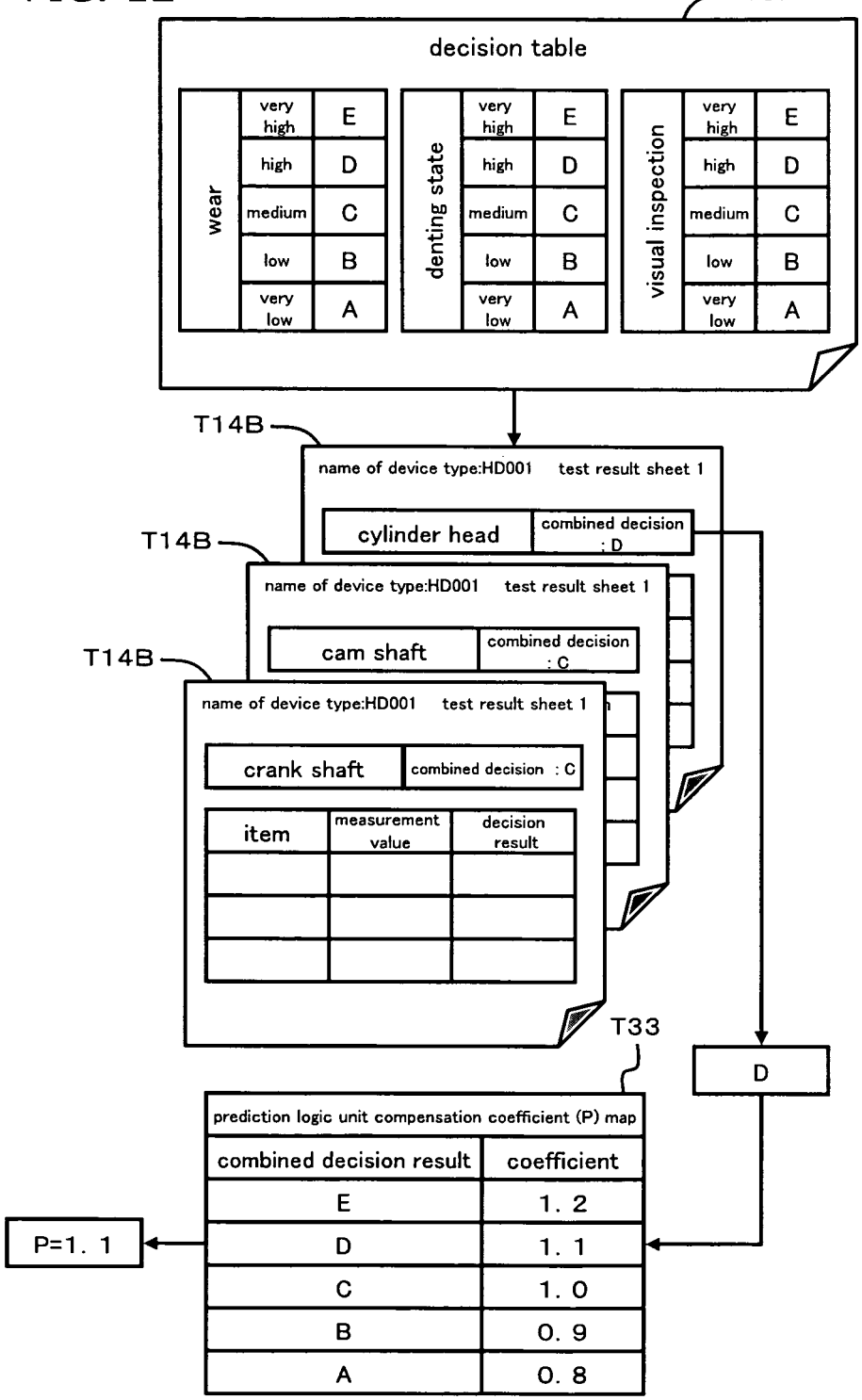
FIG. 12 is an explanatory figure showing a process for obtaining a prediction logic unit compensation coefficient.

FIG. 12 is an explanatory figure showing a method for obtaining a prediction logic unit compensation coefficient P. In the decision table T32, for each type of damage and wear experienced by an individual component (i.e. for each item tested), there are registered the extent and the evaluated value of wear and tear which has been measured by either visual inspection or measurement. "Very high" means that the damage due to wear and so on is extremely large, and to this is allocated the worst evaluation value "E". "Very low" means that the damage due to wear and so on is extremely low, and to this is allocated the best evaluation value "A".

An engine which has been exchanged out in the maintenance workplace 3 is taken apart into its individual components, such as the crank shaft and the cam shaft and so on. Measurement or testing by visual inspection of each of these individual components is performed in respect of each of a set of test items which are set in advance, and the corresponding decision results are recorded upon a test result sheet T14B. In the result of the combined decision for each of the individual components, that evaluation value is employed, among the evaluation values for each of the test items for that individual component, which is the lowest. For example, in the case of some individual component whose evaluation value for wear state is "A", whose evaluation value for denting state is "B", and whose evaluation value by visual inspection is "C", the combined evaluation for that individual component is "C".

And that evaluation value, among the combined evaluations of all the individual components, which is the lowest, is used as the final evaluation of the main component which is the aggregate of these various individual components (here, the engine). This is because if a fault occurs in any single individual component, that constitutes a fault of the engine itself. Accordingly the average value is not used; rather, the worst value is used.

In the prediction logic unit compensation coefficient map T33, the value of a compensation coefficient P is set in advance corresponding to each of the evaluation results of the combined decision result. A value of 1 is used for the normal or ordinary state, and the lower the evaluation value becomes, the more the value of the compensation coefficient P increases, and the higher the evaluation value becomes, the more the value of the compensation coefficient P decreases.

Figure 13:
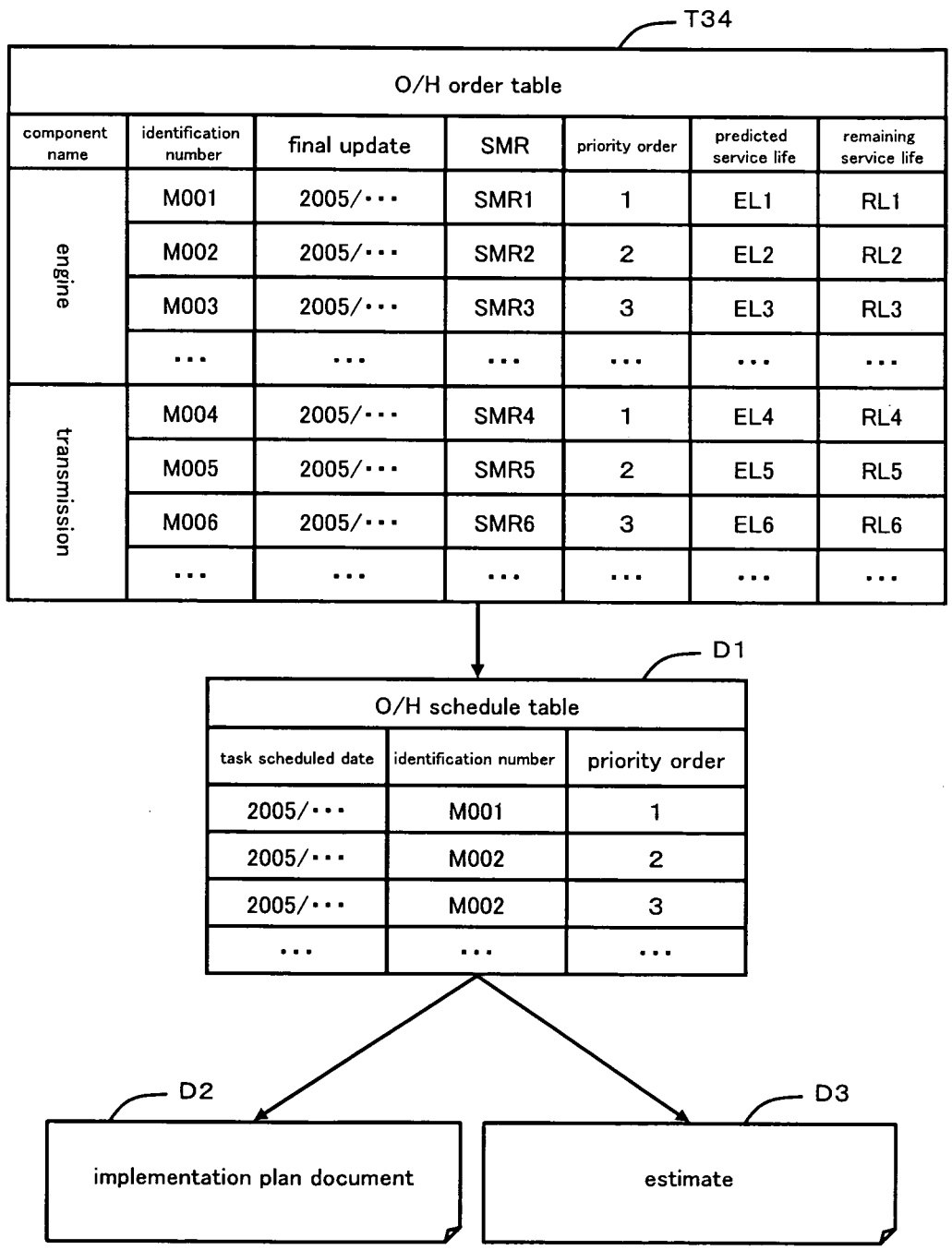
FIG. 13 is an explanatory figure showing a situation when making the overhaul schedule table.

FIG. 13 is an explanatory figure showing an example of an order table T34 in which the order of overhaul tasks is set, based upon the respective predicted service lives of various main components. The overhaul schedule table D1 is created based upon this order table T34.

The order table T34, for example, may consist, for each type of main component, of an identification number which identifies each main component, the date of the last update, the SMR, the priority order, the predicted service life, and the remaining service life, all in mutual correspondence. Here, the date of the final update specifies the newest date and time that the service life was predicted, while the SMR is the output value of the service meter 201 at the time of this newest prediction. In the priority order, there is set a number which is smaller in the order of shorter remaining service life. In the predicted service life, there is set a service life which has been calculated by either the first service life prediction unit 311 or the second service life prediction unit 312. And, in the remaining service life, a value is set which is obtained by subtracting the SMR value at the time of prediction from the predicted service life.

Here the first point to which attention should be directed is that, for each main component, a plurality of mutually differing types of service life are calculated. Accordingly, the priority order is set by rearranging the order table T34 in order of shortness of service life.

The next point to which attention should be directed is that, for main components which have the same identification number, only the one is selected whose remaining service life is the shortest, and the overhaul schedule table D1 is created by doing this. The remaining service life is divided by the planned operating time period for each month from now, and thereby the number of months over which this construction machine is able to operate is calculated. For example, if the remaining service life is 2000 hours, and the planned operating time period per one month is 500 hours, then the number of months that operation is possible is 4 (=2000/500). In this case, it is necessary to start the overhaul task for this main component of the construction machine before four months elapse from the present, at the latest. It should be understood that it would be possible to determine this time period over which operation is possible, based upon actual values for this user or the like.

The maximum processing capability of the maintenance workplace 3 is determined by the number of days the workplace operates, the number of personnel, the number of facilities, and so on. Accordingly, the number of overhaul tasks which can be performed per one month is also determined. Thus, the overhaul schedule table D1 is created by setting appointed overhaul dates in the order of shortness of remaining service life of the construction machines. A decision is made as to whether or not the contents of the overhaul schedule table D1 can be implemented, and, after any necessary corrections have been made, the implementation plan document D2 and the estimate D3 are created, and these are then proposed to the user.

Figure 14:
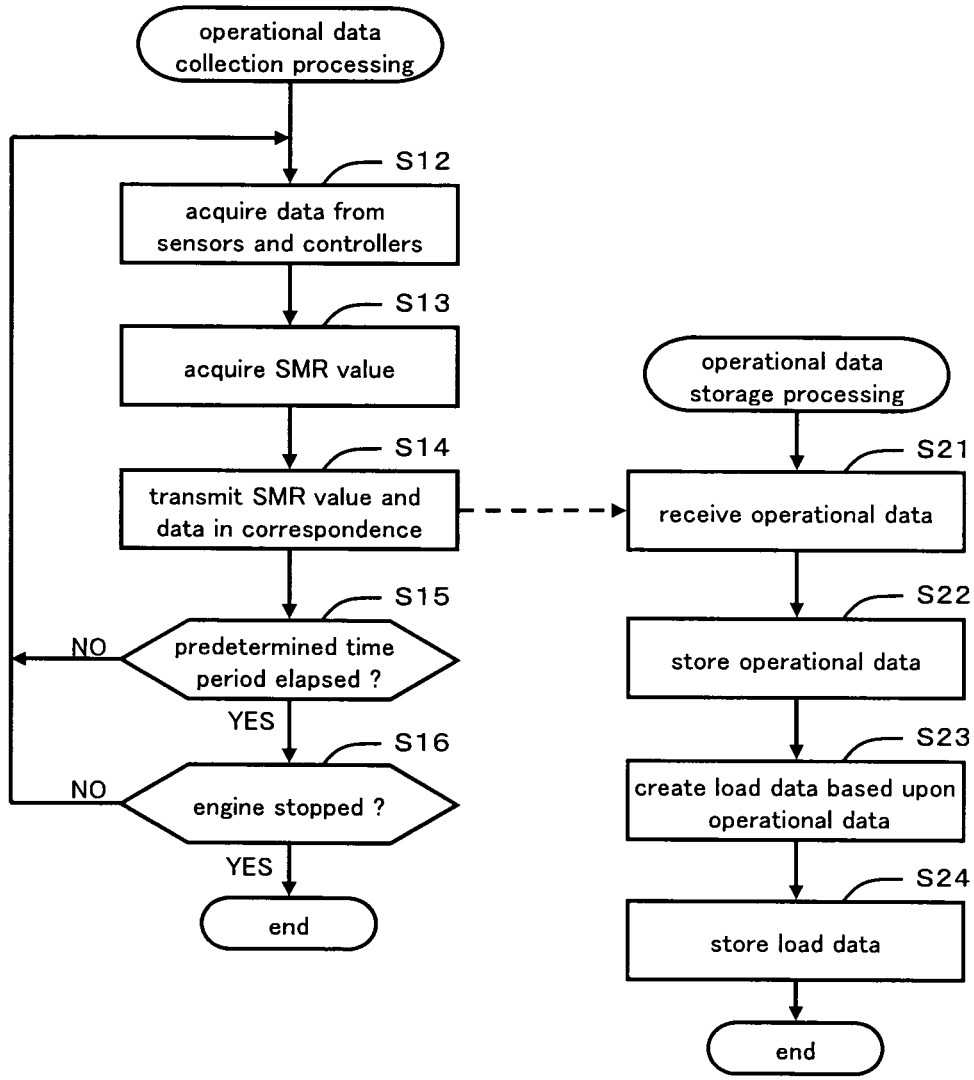
FIG. 14 is a flow chart showing processing for a server to store operational data which has been collected by a machine management device.

Next, the operation of this system will be explained. FIG. 14 is a flow chart showing processing for the machine management device 100 to collect operational data from the construction machine 21. The machine management device 100 acquires operational data from the controllers 202 and 203 and from sensors (a step S12). Next, it acquires the value from the service meter 201 (a step S13). And the machine management device 100 establishes a correspondence between the SMR value and the operational data, and transmits this to the machine management device server 11 (a step S14). Each time a predetermined period elapses (a step S15), the machine management device 100 acquires the operation data from the construction machine 21, establishes a correspondence with the SMR value, and transmits it to the server 11. And processing ends when the engine stops (YES in a step S16).

On the other hand, upon receipt of the operational data and the SMR value from the machine management device 100 (a step S21), the machine management device server 11 stores the operational data which has been thus received (a step S22). Moreover, the machine management device server 11 creates the load data T12 based upon this operational data (a step S23), and stores this load data T12 which it has created (S24). It should be understood that it would also be acceptable to arrange for the load data T12 to be created within the machine management device 100.

Figure 15:
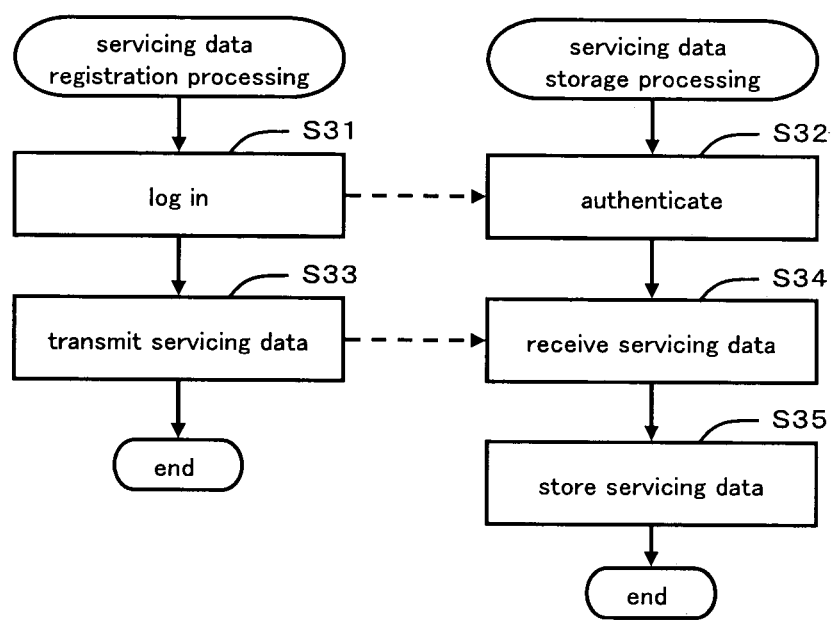
FIG. 15 is a flow chart showing processing for servicing data and analysis data for a construction machine to be registered on a server.

FIG. 15 is a flow chart showing processing for registering, upon the machine management device server 11, servicing data and analysis data which have been obtained in relation to the construction machines 21 and 22. For example, the terminal 31 of the maintenance workplace or the terminal 41 of the analysis center 4 tries to access the machine management device server 11 and log in (a step S31). And the machine management device server 11, for example, receives input of a user ID and a password or the like, and performs authentication of the user (a step S32).

After this user authentication has succeeded, the terminal 31 or 41 transmits servicing data or analysis data to the machine management device server 11 (a step S33). And, upon receipt of this servicing data or the like (a step S34), the machine management device server 11 stores it in the storage device 11A (a step S35).

Figure 16:
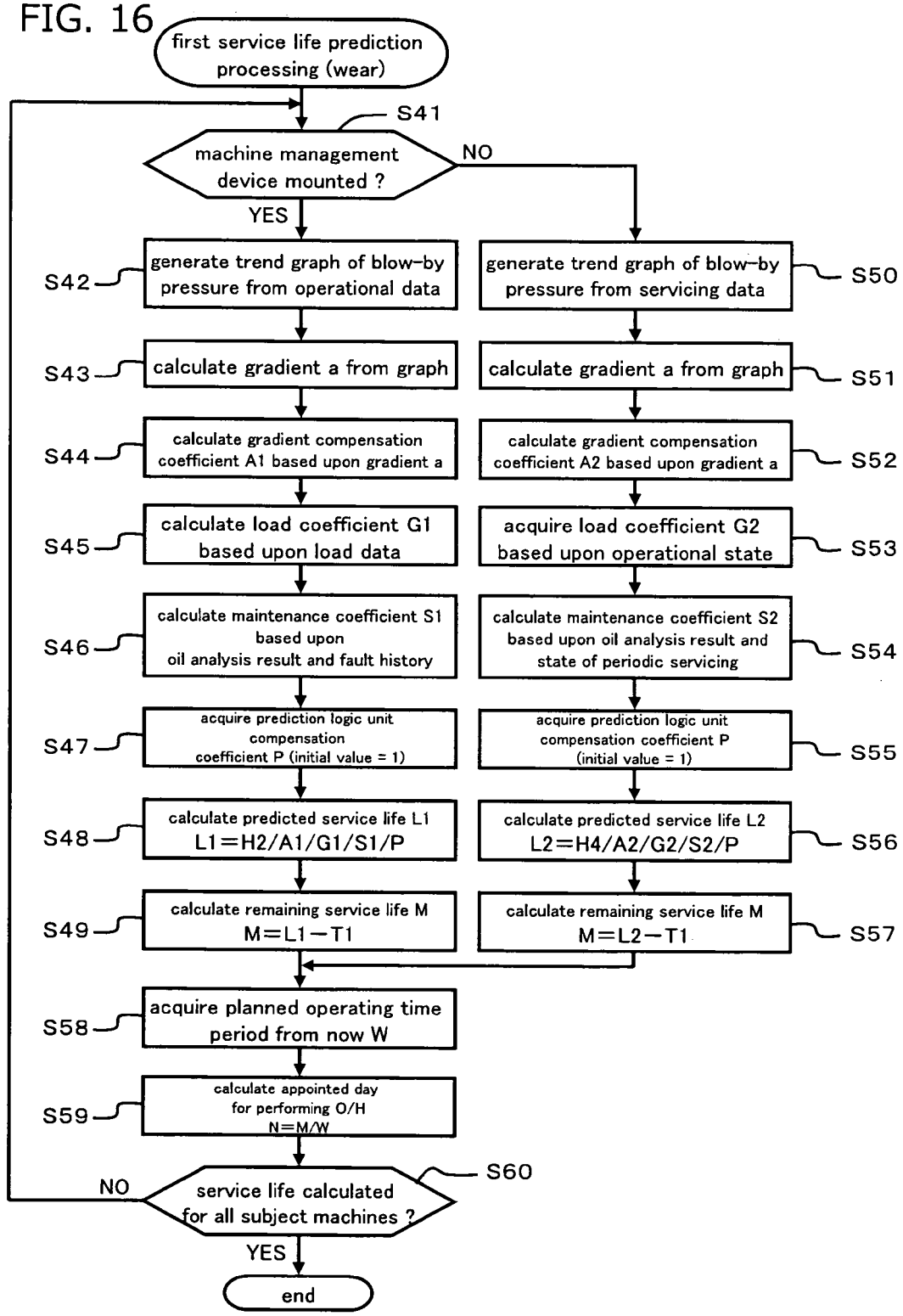
FIG. 16 is a flow chart showing processing for predicting a service life based upon wear state.

FIG. 16 is a flow chart showing processing for predicting the first service life for a component (a main component), based upon the wear and so on of that component. This processing is executed by the logic unit 300 of the machine management device server 11.

The logic unit 300 decides whether or not this is service life prediction related to a construction machine to which a machine management device 100 is mounted (a step S41). If the construction machine which is the subject of prediction is one to which a machine management device 100 is mounted (YES in the step S41), then the remaining service life is calculated by executing, in order, the steps S42 through S49 which will be described hereinafter. By contrast, if the construction machine which is the subject of prediction is one to which no such machine management device 100 is mounted (NO in the step S41), then the remaining service life is calculated by executing, in order, the steps S50 through S57 which will be described hereinafter.

To explain first the case in which the construction machine in question is indeed equipped with such a machine management device 100: based upon the operational data T11, the logic unit 300 constructs a trend graph which shows the change over time of the blow-by pressure (a step S42), and obtains the gradient a from this trend graph (a step S43).

Figure 17:
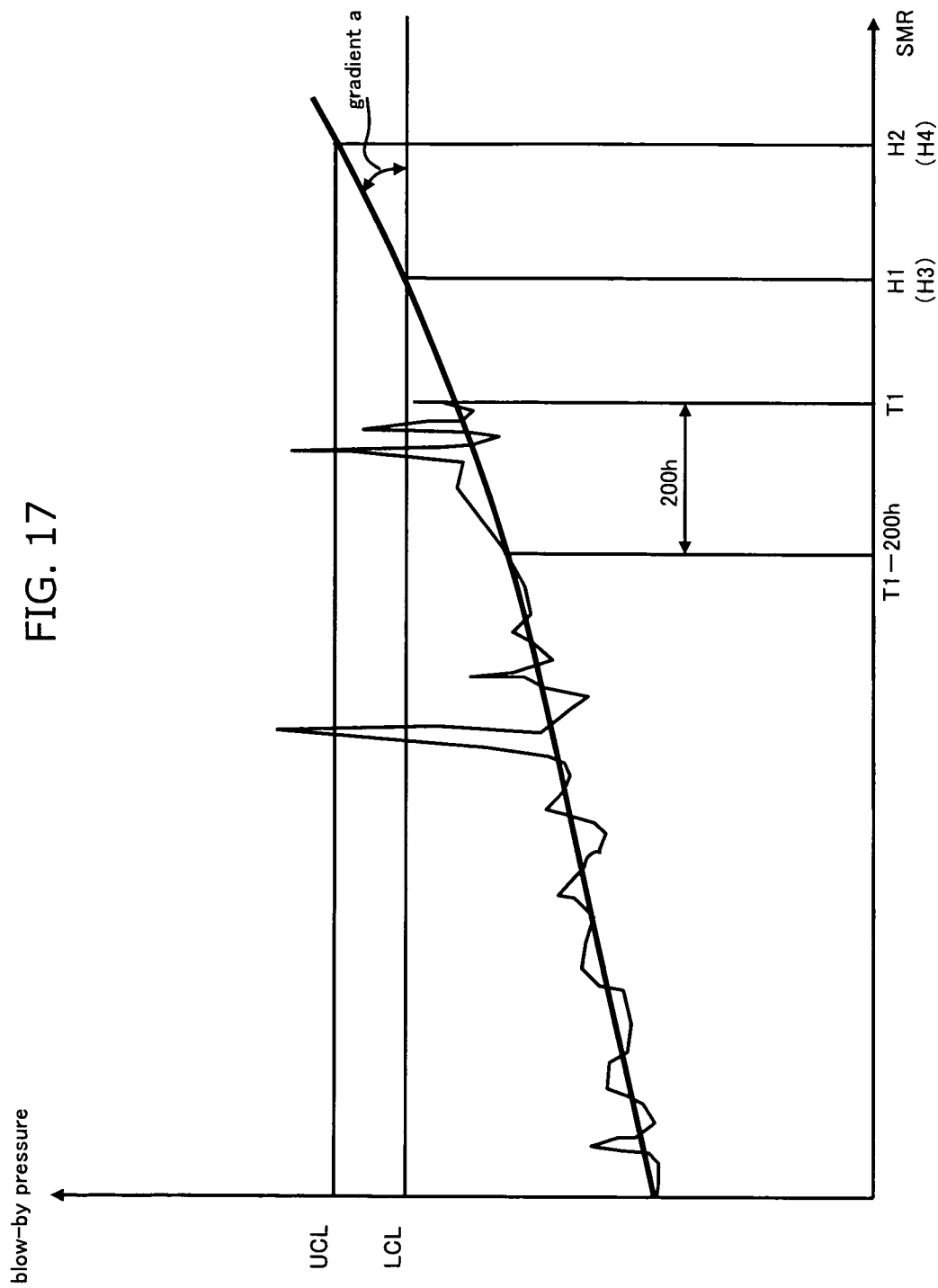
FIG. 17 is an explanatory figure showing a trend graph for blow-by pressure.

This point will now be explained with reference to FIG. 17. FIG. 17 shows such a trend graph for the blow-by pressure. The blow-by pressure is shown along the vertical axis in the figure, and time is shown along the horizontal axis. The present time instant (the present SMR value) is supposed to be T1. UCL represents a limit value, and LCL represents a warning value. The time instant H1 represents the SMR value at the time instant that it is predicted that the blow-by pressure will reach the warning value LCL. And the time instant H2 represents the SMR value at the time instant that it is predicted that the blow-by pressure will reach the limit value UCL.

The blow-by pressure which is transmitted from the machine management device 100 changes in various ways from time to time according to the operational state. An approximate curve is obtained from this blow-by pressure data. This approximate curve is shown in the figure by the thick line. The time instant that this approximate curve reaches the warning value LCL is H1, and the time instant that it reaches the limit value UCL is H2. The logic unit 300 obtains the gradient a of the approximate curve between H1 and H2. In other words, this gradient a represents the extent of the change from when the blow-by pressure reaches the warning value LCL to when it arrives at the limit value UCL. The larger is this gradient a, the more rapidly does the blow-by pressure arrive at the limit value UCL, and conversely, the smaller is this gradient a, the more slowly does the blow-by pressure arrive at the limit value UCL.

It should be understood that "T1−200 h" shown in FIG. 17 means the time instant 200 hours before the present time instant. Moreover, the time instants H3 and H4 are used when no machine management device 100 is mounted to the construction machine.

We now return to FIG. 16. After calculating the gradient a (in the step S43), a gradient compensation coefficient A1 is calculated based upon this gradient a (a step S44). Here, a gradient compensation coefficient A1 is set in advance for each range of the value of the gradient a. For example, if the value of the gradient a is less than 0.5 (a<0.5), then the value of the coefficient A1 becomes 0.9. And if the value of the gradient a is 0.5 or larger, then, if it is smaller than 1.0 (0.5≦a<1.0), then the value of the coefficient A1 becomes 1.0. But if the value of the gradient a is 1.0 or greater (1.0 a), then the value of the coefficient A1 becomes 1.1. In other words, the more abrupt it is predicted that the change of the blow-by pressure is, the larger is the value to which the gradient compensation coefficient A1 is set.

Next, the logic unit 300 calculates the load coefficient G1 based upon the load data T12, as described above along with FIG. 10 (a step S45). And next, the logic unit 300 calculates the maintenance coefficient S1 based upon the oil analysis result and the fault history management data T13, as described above along with FIG. 6 (a step S46). Moreover, the logic unit 300 acquires the prediction logic unit compensation coefficient P based upon the test results for the main components which were removed when the overhaul task was performed the previous time, as described above along with FIG. 12 (a step S47). In the case of an overhaul task which is the first one for this construction machine, the value of this compensation coefficient is set to 1.

And the logic unit 300 calculates the predicted service life L1 by dividing the value of the time instant H2 by each of the coefficients (A1, G1, S1, and P) (i.e. by L1=H2/A1/G1/S1/P) (a step S48). In other words the reference service life H2, which is predicted from the change of the blow-by pressure in which the actual wear state is reflected, comes to be compensated by the various coefficients described above. And the logic unit 300 calculates the remaining service life M by subtracting the present time instant T1 from this predicted service life L1 which has been compensated (a step S49).

On the other hand, if the construction machine which is the subject for prediction is not in fact equipped with such a machine management device 100 (NO in the step S41): based upon the details described in the periodic servicing register T15, in a similar manner to what was done previously, the logic unit 300 constructs a trend graph for the blow-by pressure, and obtains the gradient a from this trend graph (a step S50). And the logic unit 300 calculates a gradient compensation coefficient A2 based upon this gradient a (a step S51).

And the logic unit 300 acquires the load coefficient G2 from the table T12C, based upon the present operational state, as described above along with FIG. 11 (a step S53). Next, the logic unit 300 calculates the maintenance coefficient S2 based upon the oil analysis result and the state of periodic servicing, as shown in FIG. 6 (a step S54). Moreover, as described in FIG. 12, the logic unit 300 acquires the prediction logic unit compensation coefficient P from the map T33 (a step S55), and calculates the predicted service life L2 (a step S56). In the case of an overhaul task which is the first one for this construction machine, the value of this compensation coefficient is set to 1.

In this manner, the predicted service life L2 is calculated by compensating the reference service life H4 (the time instant that the blow-by pressure reaches the limit value UCL) which has been obtained from the trend graph of the blow-by pressure, according to the various coefficients (A2, G2, S2, and P). And the logic unit 300 calculates the remaining service life M by subtracting the present time instant T1 from this predicted service life L2 which has been compensated (a step S57).

And the logic unit 300 acquires the planned operating time period W per one month from now for this construction machine, and calculates an appointed day N at which the overhaul task is to be performed by dividing the remaining service life M by this planned operating time period W (a step S59).

The logic unit 300 then makes a decision as to whether or not an appointed day for overhaul has been calculated for all of the construction machines which are disposed at this place of work 2 (a step S60). If some construction machine exists for which this calculation has not yet been performed (NO in the step S60), then the flow of control returns to the step S41 and the above described steps are repeated. However, if an appointed day for the overhaul task has been calculated for all of the construction machines of the construction machine group which is disposed in this place of work 2 (YES in the step S60), then this processing terminates.

Figure 18:
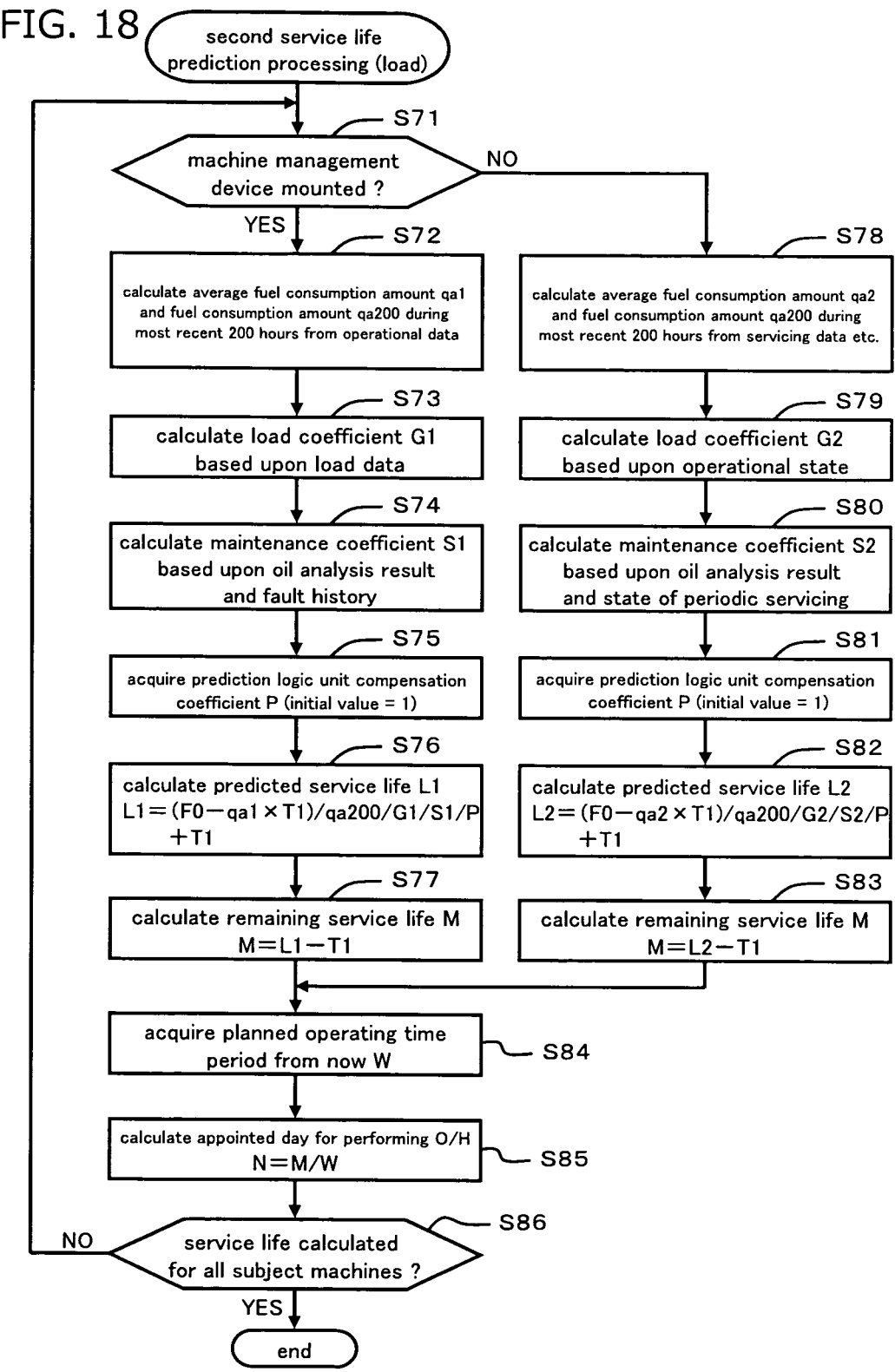
FIG. 18 is a flow chart showing processing for service life prediction processing based upon cumulative load amount.

FIG. 18 is a flow chart showing processing for predicting the second service life of a component (a main component), based upon the cumulative load amount upon that component. This processing is executed by the logic unit 300 of the machine management device server 11.

The logic unit 300 decides whether or not the construction machine which is the subject of prediction is one to which a machine management device 100 is mounted (a step S71). If the construction machine which is the subject of prediction is one to which a machine management device 100 is mounted (YES in the step S71), then, based upon the operational data T11, the logic unit 300 calculates (a step S72) an average fuel consumption amount qa1 up to the present time point T1 and a fuel consumption amount qa200 during the most recent 200 hours (the period from the present time point T1 to 200 hours before).

And the logic unit 300 calculates the load coefficient G1 based upon the load data T12 (a step S73), calculates the maintenance coefficient S1 based upon the oil analysis result and the fault history management data T13 (a step S74), and acquires the prediction logic unit compensation coefficient P (a step S75).

Next, the logic unit 300 obtains a remaining load amount (F0−qa1×T1) by subtracting the grand total (qa1×T1) of the fuel consumption amount up to the present (T1) from the design lifetime load amount F0, and calculates the predicted service life L1 (a step S76) by dividing this remaining load amount by each of the coefficients (qa200, G1, S1, and P) and adding the present time point T1 thereto ((F0−qa1×T1)/qa200/G1/S1/P+T1). The reference service life which is predicted from the grand total value of the fuel consumption amount is compensated by the various coefficients described above. And the logic unit 300 calculates the remaining service life M by subtracting the present time instant T1 from this predicted service life L1 which has been compensated (a step S77). Here, the design lifetime load amount F0 is a value which can be determined from the results of various types of performance test and endurance test during the design of this component, and indicates the total amount of fuel which it is estimated will be consumed within the period over which this component is capable of operating.

By contrast, if the construction machine which is the subject of prediction is one to which no such machine management device 100 is mounted (NO in the step S71), then the logic unit 300 calculates (a step S78) the average fuel consumption amount qa1 and the fuel consumption amount qa200 during the most recent 200 hours), based upon the details described in the periodic servicing register T15 and the actual result values obtained by the user. Furthermore, the logic unit 300 acquires the load coefficient G2 from the table T12C based upon the present operational state (a step S79), and calculates the maintenance coefficient S2 based upon the oil analysis results and the state of periodic servicing (a step S80). Moreover, the logic unit 300 acquires the prediction logic unit compensation coefficient P from the map T33 (a step S81), and calculates the predicted service life L2 (a step S82).

And the logic unit 300 obtains the reference service life (F0−qa1×T1) by subtracting the grand total (qa1×T1) of the fuel consumption amount from the design lifetime load amount F0, and calculates the predicted service life L2 by dividing this reference service life by each of the coefficients (qa200, G2, S1, and P) and adding the present time point T1 thereto ((F0−qa1×T1)/qa200/G1/S1/P+T1). And the logic unit 300 calculates the remaining service life M by subtracting the present time instant T1 from this predicted service life L2 which has been predicted (a step S83).

Then the logic unit 300 acquires the planned operating time period W per one month from now for this construction machine (a step S84), and calculates an appointed day N at which the overhaul task is to be performed by dividing the remaining service life M by this planned operating time period W (a step S85). And, if the logic unit 300 has calculated an appointed day for the overhaul task for all of the construction machines of the construction machine group which is disposed in this place of work 2 (YES in the step S86), then this processing terminates.

Figure 19:
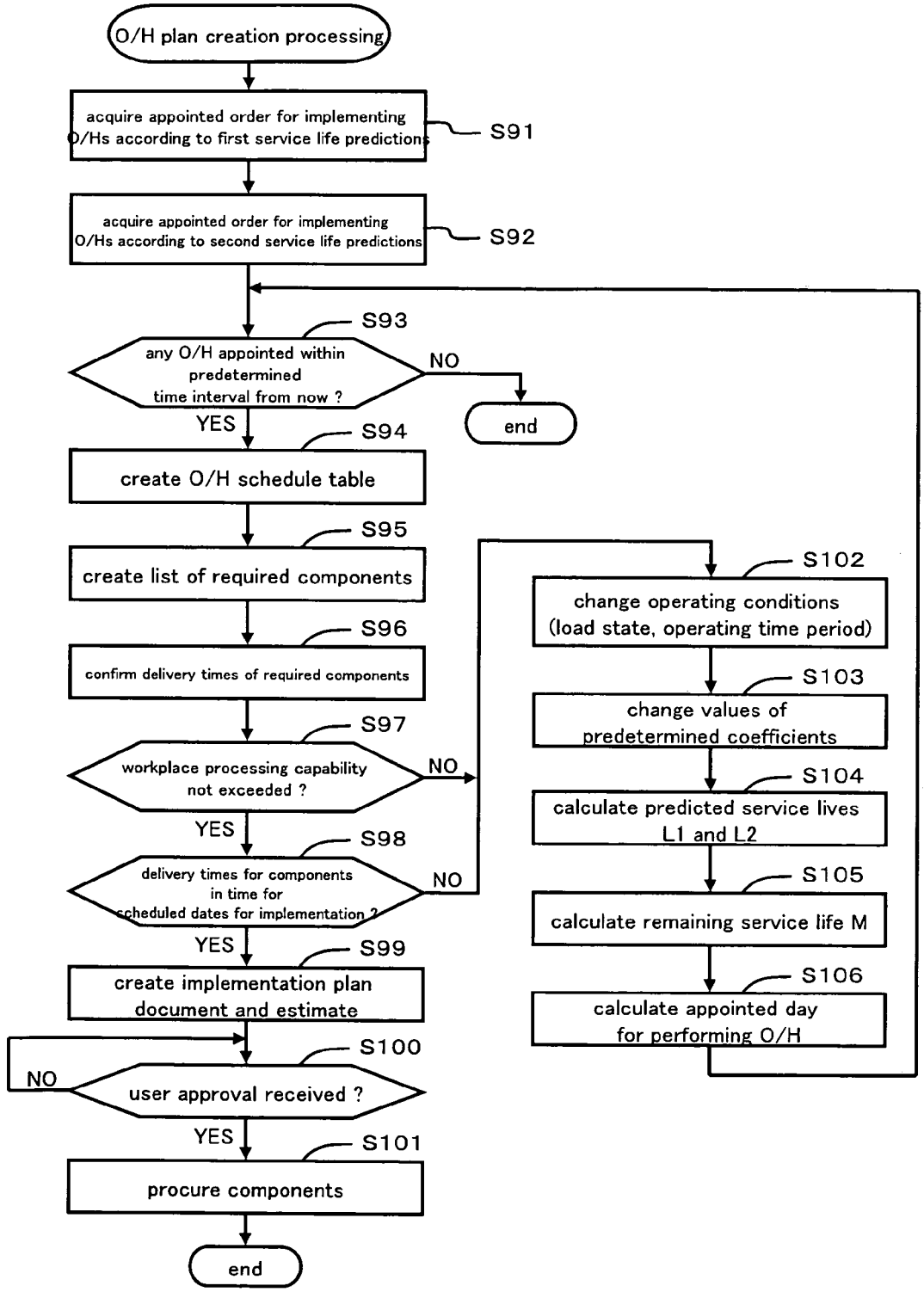
FIG. 19 is a flow chart showing processing for creating an overhaul implementation plan.

FIG. 19 is a flow chart showing processing for creating an overhaul plan. This processing is executed, for example, by the logic unit 300 of the machine management device server 11. The logic unit 300 acquires the first service life which has been calculated by the first service life prediction unit 311 (a step S91), and acquires the second service life which has been calculated by the second service life prediction unit 312 (a step S92).

Next, the logic unit 300 decides whether or not an appointed day for an overhaul task exists within a predetermined time interval (for example, six months) from now (a step S93). If not even one construction machine exists for which it is necessary to perform an overhaul task within the predetermined time interval from now (NO in the step S93), then this processing terminates, since it is not necessary to draw up an implementation plan.

If at least one construction machine exists for which an overhaul task has been appointed within the predetermined time interval from now (YES in the step S93), then the logic unit 300 creates the overhaul schedule table D1 (a step S94). Moreover, the logic unit 300 creates the list T22 of components which are required for this overhaul task (a step S95), and confirms the stock and the delivery times of the necessary components by referring to the stock list T21 (a step S96).

Next, the logic unit 300 makes a decision as to whether or not the number of overhaul tasks per one month registered in the overhaul schedule table D1 exceeds the task capability per month of the maintenance workplace 3 (a step S97). If the task capability of the maintenance workplace 3 is not exceeded (YES in the step S97), then the logic unit 300 makes a decision as to whether or not the required components for these overhaul tasks will be delivered to the maintenance workplace 3 before the times that the overhaul tasks are due to be started (a step S98). If the delivery times of the required components will be in time (YES in the step S98), then the logic unit 300 creates an implementation plan document D2 and an estimate D3 for the overhaul tasks, based upon the overhaul schedule table D1 (a step S99).

When input is received to the effect that approval from the user for the implantation plan document D2 and the estimate D3 has been received (YES in the step S100), then the logic unit 300 commands for the required components to be procured (a step S101). It should be understood that the steps S99, S100, and S101 may be implemented as a collaborative task shared between the logic unit 300 and a human being.

By contrast, if the number of overhaul tasks exceeds the task capability of the maintenance workplace 3 (NO in the step S97), or if the delivery times for the required components will not be in time for the time point that an overhaul task starts (NO in the step S98), then it is not possible to implement the overhaul tasks according to the schedule which is described in the overhaul schedule table D1.

Thus, the logic unit 300 tries to correct the overhaul schedule table D1. In other words, the logic unit 300 changes the operational conditions such as the load state or the operating time period (a step S102), and changes the values of at least one of the predetermined coefficients among the various coefficients which are used in the service life predictions, according to these changes of operational conditions (a step S103). As possibilities for the predetermined coefficient, qa200, G1, and G2 may be cited. As far as S1 and S2 go, their initial values are used without modification.

The logic unit 300 recalculates the predicted service lives L1 and L2 using the changed coefficient(s) (a step S104), and corrects the calculation of the remaining service life M (a step S105). And it calculates the appointed day for overhaul by dividing the remaining service life M by the planned operating time period W (a step S106), and then the flow of control is returned to the step S93. In this manner, the logic unit 300 again simulates the appointed day for overhaul by reducing the load upon the specified construction machine, or by shortening its operating time period.

According to this embodiment having the structure described above, the following advantageous effects are obtained. In this embodiment, it is arranged not only to perform the prediction of service life based upon the cumulative load amount, but to predict the service life from other aspects based upon the state of wear which has actually appeared and so on, and to employ whichever of the various predicted service lives is the shortest. Accordingly, it is possible to predict service life in consideration of concrete individual causes such as the working environment and so on, and it is also possible to respond to abrupt decrease of service life and the like, and to enhance the reliability of the predictions of service life.

As a result of the enhancement of prediction accuracy of the service life, it is possible to suggest an overhaul implementation plan at an early stage, so that it is possible to perform the procurement of the necessary components and so on smoothly. Accordingly, it is possible to suppress the possibility of decrease of productivity of the user due to increase of the period in which a construction machine remains inactive.

Since, in this embodiment, the overhaul schedule table D1 is corrected in consideration of the task capability of the maintenance workplace 3 and the delivery times for the required components, accordingly it is possible to create an appropriate overhaul implementation plan and to suggest it to the user, and moreover it becomes possible to employ the capability of the maintenance workplace 3 without any useless waste of resources.

In this embodiment, it is arranged for the prediction logic unit compensation coefficient P to be entered into the calculation equation for service life prediction, and for the actual test results to be fed back to the logic unit for service life prediction with the coefficient P. Accordingly, the more often an overhaul tasks is performed, the more is the prediction accuracy of service life enhanced, for the same type of construction machine which is operating in the same workplace.

In this embodiment, when predicting the service life based upon the cumulative load amount, it is arranged to perform compensation according to the load amount (qa200) for the most recent predetermined time period. Accordingly even in a case such as when, for example, due to the circumstances of the user or the like, the operating conditions of the construction machine change frequently, it is possible to reflect the most recent environment of use of the construction machine in the results of service life prediction, and it is possible to improve the accuracy of prediction based upon the cumulative load amount.

In this embodiment, it is arranged to use the same calculation equation for service life prediction, both for the construction machine 21 to which the machine management device 100 is mounted, and for the construction machine 22 to which no such device is mounted, so that only the source for acquisition of the coefficient to be used needs to be changed. Accordingly it is possible to simplify the structure of the logic unit 300, and, irrespective of the presence or absence of any machine management device 100 which may be mounted, it is possible to predict a service life for, and to draw up an overhaul implementation plan for, each and every one of the construction machines which operate in the place of work 2. Due to this, it becomes possible to apply the present invention even to a place of work 2 in which old type construction machines and new type construction machines are mixed together, and moreover it is possible to create an overhaul implementation plane, even if one of the machine management devices 100 has been removed from a new type construction machine, or if a fault has occurred in one of the machine management devices 100.

It should be understood that the present invention is not to be considered as being limited by the embodiments described above. A person skilled in the relevant art will be able to make various additions or changes or the like within the range of the present invention. For example, a person skilled in the art will be able to combine the above embodiments in appropriate combinations.

The invention claimed is:

1. A construction machine maintenance work management system which manages, between a plurality of construction machines, maintenance tasks for exchanging components installed to the construction machines, comprising:
   said construction machines, and said components including at least one of a transmission, a hydraulic pump, and a metal part of an engine;
   a first service life prediction unit which predicts first service lives of said components, based upon changes of first parameters in which wear states of said components are reflected over time and according to a compensation coefficient based upon test data for a previous component of said components;
   a second service life prediction unit which predicts second service lives of said components, based upon second parameters in which cumulative load amounts of said components are reflected over time and lifetime cumulative load amounts which are set in advance;
   an order setting unit which selects, as service lives of said components, the ones which are the shorter among said first predicted service lives and said second predicted service lives, and which sets an order for the maintenance tasks between said plurality of construction machines so that maintenance is performed upon each of said components which said plurality of construction machines possess, in an order beginning from that construction machine which has the one of said components whose life is the shortest among said selected lives; and
   a maintenance schedule generation unit which generates a maintenance schedule for said components, based upon said order which has been set.

2. The construction machine maintenance work management system according to claim 1, further comprising a maintenance schedule generation unit which generates a maintenance schedule for said plurality of construction machines, based upon said order which has been set.

3. The construction machine maintenance work management system according to claim 2, comprising a correction unit which corrects said maintenance schedule by acquiring, from a data management unit, states of components required for maintenance tasks for said plurality of construction machines, a state of a workforce, and of times required for tasks.

4. The construction machine maintenance work management system according to claim 2, further comprising a plan creation unit which, when it is decided based upon states of components required for maintenance tasks for said plurality of construction machines, upon a state of a workforce, and upon a state of time periods for tasks, stored in a data management unit, that there is no stock of some component required for some maintenance task: changes operational conditions of said construction machine which requires said component to operational conditions in which the load thereupon becomes lighter; reviews its first service life and its second service life based upon these changed operational conditions; and creates a task plan for the maintenance tasks, based upon said first service life and said second service life which have been reviewed.

5. The construction machine maintenance work management system according to claim 1, wherein:
   said first service life prediction unit predicts said first service life by compensating a first basic service life which has been obtained from said first parameter, according to said compensation coefficient; and
   said second service life prediction unit predicts said second service life by compensating a second basic service life which has been obtained from said second parameter according to said compensation coefficient.

6. The construction machine maintenance work management system according to claim 1, wherein:
   (1) said first service life prediction unit:
      (1-1) for a construction machine, among said plurality of construction machines, which is equipped with a state detection device which detects a state of said construction machine, predicts said first service life by acquiring said first parameter from data transmitted from said state detection device; and
      (1-2) for a construction machine, among said plurality of construction machines, which is not equipped with such a state detection device, predicts said first service life by acquiring said first parameter from servicing history data which has been accumulated by a data management unit; and
   (2) said second service life prediction unit:
      (2-1) for a construction machine which is equipped with such a state detection device, predicts said second service life by acquiring said second parameter from data transmitted from said state detection device; and
      (2-2) for a construction machine which is not equipped with such a state detection device, predicts said second service life by acquiring said second parameter from said servicing history data.

7. A construction machine maintenance work management system for managing maintenance tasks for exchanging components of a plurality of construction machines, characterized by comprising:
   said construction machines, and said components including at least one of a transmission, a hydraulic pump, and a metal part of an engine;
   a management center which is capable of communicating via a communication network with each of said plurality of construction machines, directly or indirectly;
   a computer terminal for maintenance, which is provided in a maintenance facility for performing maintenance tasks for each of said plurality of construction machines, and which is connected to said management center via said communication network so as to be capable of communicating therewith;
   a computer terminal for analysis, which is provided in an analysis facility for performing analysis of a state of each of said plurality of construction machines, and which is connected to said management center via said communication network so as to be capable of communicating therewith; and a state detection device which detects the state of at least one construction machine among said plurality of construction machines, and transmits said state to said management center;

and wherein said management center comprises:

a first data management unit for acquiring and storing data related to the states of each of said plurality of construction machines from said computer terminal for maintenance, said computer terminal for analysis, and said state detection device;

a second data management unit for storing states of components required for the maintenance tasks for said plurality of construction machines, a state of a workforce, and a state of time periods for tasks;

a first service life prediction unit which predicts first service lives of said components, based upon first parameters in which wear states of said components are reflected over time and according to a compensation coefficient based upon test data for a previous component of said components;

a second service life prediction unit which predicts second service lives of said components, based upon second parameters in which cumulative load amounts of said components are reflected over time and lifetime cumulative load amounts which are set in advance;

an order setting unit which selects, as service lives of said components, the ones which are the shorter among said first predicted service lives and said second predicted service lives, and which sets an order for the maintenance tasks between said plurality of construction machines so that maintenance is performed upon each of said components which said plurality of construction machines possess, in an order beginning from that construction machine which has the one of said components whose life is the shortest among said selected lives;

a maintenance schedule generation unit which generates a maintenance schedule for said components, based upon said order which has been set;

and a correction unit which corrects said maintenance schedule by acquiring, from said second data management unit, the states of said components required for said maintenance tasks, the state of the workforce, and the state of times required for the tasks;

and wherein:

said first service life prediction unit, for a construction machine among said plurality of construction machines which is equipped with said state detection device, predicts said first service life by acquiring said first parameter from data transmitted from said state detection device; and, for a construction machine among said plurality of construction machines which is not equipped with said state detection device, predicts said first service life by acquiring said first parameter from servicing history data which has been accumulated by said first data management unit;

said second service life prediction unit, for a construction machine which is equipped with said state detection device, predicts said second service life by acquiring said second parameter from data transmitted from said state detection device; and, for a construction machine which is not equipped with said state detection device, predicts said second service life by acquiring said second parameter from said servicing history data.

8. A construction machine maintenance work management system which manages, between a plurality of construction machines, maintenance tasks for exchanging components installed to the construction working machines, comprising:

said construction machines, and said components including at least one of a transmission, a hydraulic pump, and a metal part of an engine;

a first service life prediction unit which predicts first service lives of said components, based upon changes of first parameters in which wear states of said components are reflected over time and according to a compensation coefficient derived from test data for a previous component of said components;

a second service life prediction unit which predicts second service lives of said components, based upon second parameters in which cumulative load amounts of said components are reflected and lifetime cumulative load amounts which are set in advance;

an order setting unit which selects, as service lives of said components, the ones which are the shorter among said first predicted service lives and said second predicted service lives, and which sets an order for the maintenance tasks between said plurality of construction machines so that maintenance is performed upon each of said components which said plurality of construction machines possess, in an order beginning from that construction machine which has the one of said components whose life is the shortest among said selected lives, wherein among said first predicted service lives and said second predicted service lives, the shorter ones are selected as lives of said components; and a maintenance schedule generation unit which generates a maintenance schedule for said plurality of construction machines, based upon said order which has been set.

* * * * *